US012740847B2

(12) United States Patent
Nonaka et al.

(10) Patent No.: US 12,740,847 B2
(45) Date of Patent: Sep. 22, 2026

(54) ZIRCONIA MILL BLANK FOR DENTAL CUTTING AND MACHINING AND PREPARING METHOD THEREOF

(71) Applicant: SHOFU INC., Kyoto (JP)

(72) Inventors: Kazumichi Nonaka, Kyoto (JP); Shuhei Takahashi, Kyoto (JP)

(73) Assignee: SHOFU INC., Kyoto (JP)

( * ) Notice: Subject to any disclaimer, the term of this patent is extended or adjusted under 35 U.S.C. 154(b) by 62 days.

(21) Appl. No.: 18/423,978

(22) Filed: Jan. 26, 2024

(65) Prior Publication Data

US 2024/0164868 A1 May 23, 2024

Related U.S. Application Data

(63) Continuation of application No. 16/546,426, filed on Aug. 21, 2019, now Pat. No. 11,986,362.

(30) Foreign Application Priority Data

Aug. 22, 2018 (JP) ................................ 2018-155064
Aug. 22, 2018 (JP) ................................ 2018-155065

(51) Int. Cl.

| | |
|---|---|
| ***A61C 1/08*** | (2006.01) |
| ***A61C 3/02*** | (2006.01) |
| ***B22F 3/04*** | (2006.01) |
| ***B22F 3/24*** | (2006.01) |
| ***C04B 35/622*** | (2006.01) |
| ***C04B 38/00*** | (2006.01) |
| ***C04B 111/00*** | (2006.01) |

(52) U.S. Cl.

CPC .................. *A61C 1/08* (2013.01); *A61C 3/02* (2013.01); *B22F 3/04* (2013.01); *C04B 35/622* (2013.01); *C04B 38/0074* (2013.01); *B22F 2003/242* (2013.01); *B22F 2302/25* (2013.01); *B22F 2304/056* (2013.01); *C04B 2111/00836* (2013.01); *C04B 2235/3225* (2013.01); *C04B 2235/602* (2013.01)

(58) Field of Classification Search

None

See application file for complete search history.

(56) References Cited

U.S. PATENT DOCUMENTS

| | | | |
|---|---|---|---|
| 4,722,915 | A | 2/1988 | Soma et al. |
| 2003/0031984 | A1 | 2/2003 | Rusin et al. |
| 2003/0125189 | A1 | 7/2003 | Castro et al. |
| 2010/0130346 | A1 | 5/2010 | Laine et al. |
| 2012/0251979 | A1 | 10/2012 | Karim et al. |
| 2013/0217562 | A1 | 8/2013 | Yamauchi et al. |
| 2013/0224454 | A1 | 8/2013 | Jung et al. |
| 2013/0313738 | A1 | 11/2013 | Carden |
| 2015/0238291 | A1 | 8/2015 | Hauptmann et al. |
| 2015/0282905 | A1 | 10/2015 | Jahns |
| 2016/0212898 | A1 | 7/2016 | Ohashi et al. |
| 2016/0310245 | A1 | 10/2016 | Fujisaki et al. |
| 2017/0143458 | A1 | 5/2017 | Fujisaki et al. |
| 2017/0216000 | A1 | 8/2017 | Jahns et al. |
| 2019/0231494 | A1 | 8/2019 | Dittmann et al. |
| 2019/0231651 | A1 | 8/2019 | Ito |
| 2020/0317581 | A1 | 10/2020 | Ito |

FOREIGN PATENT DOCUMENTS

| | | |
|---|---|---|
| CN | 107162603 | 9/2017 |
| EP | 2 639 210 | 9/2013 |
| EP | 3 108 849 | 12/2016 |
| JP | 60-235762 | 11/1985 |
| JP | 2007-22889 | 2/2007 |
| JP | 2008115021 A * | 5/2008 |
| JP | 5396691 | 11/2013 |
| JP | 5608976 | 9/2014 |
| JP | 2015-137187 | 7/2015 |
| JP | 6321644 | 4/2018 |
| WO | 2010/011891 | 1/2010 |
| WO | 2015/029244 | 3/2015 |
| WO | 2015/098765 | 7/2015 |
| WO | 2015/199018 | 12/2015 |
| WO | 2018/056330 | 3/2018 |
| WO | 2018/056331 | 3/2018 |

OTHER PUBLICATIONS

JP 2008115021 Eng translation (Year: 2008).*

Extended European Search Report issued Aug. 6, 2020 in corresponding European Patent Application No. 19192506.4.

Office Action issued Jun. 28, 2023 in Japanese Patent Application No. 2019-150009, with English-language translation.

Matsuo, Yohtaro et al., "Forming of Ceramic Powders by Cyclic CIP and its Effect on the Strength of Sintered Body", Journal of The Society of Powder Technology, 1991, vol. 28, No. 3, pp. 182-187 (36-41).

* cited by examiner

*Primary Examiner* — Jeffrey D Washville

(74) *Attorney, Agent, or Firm* — Wenderoth, Lind & Ponack, L.L.P.

(57) ABSTRACT

To provide a zirconia mill blank for dental cutting and machining which has excellent machinability in a thin workpiece such as an inlay, an onlay and a veneer, and may impart high strength and high translucency to a zirconia perfect sintered body without a special sintering such as HIP treatment, and a preparing method thereof.

The zirconia mill blank for dental cutting and machining has a porosity within a range of 15 to 30%.

16 Claims, No Drawings

ZIRCONIA MILL BLANK FOR DENTAL CUTTING AND MACHINING AND PREPARING METHOD THEREOF

CROSS-REFERENCE TO RELATED APPLICATIONS

This application is based on and claims the benefit of priorities from Japanese Patent Application Serial No. 2018-155064 (filed on Aug. 22, 2018) and Japanese Patent Application Serial No. 2018-155065 (filed on Aug. 22, 2018), the contents of which are hereby incorporated by reference in their entirety.

BACKGROUND OF THE INVENTION

Field of the Invention

The present disclosure relates to a zirconia mill blank for dental cutting and machining and a preparing method thereof, and more specifically to a zirconia mill blank for dental cutting and machining adaptable to high speed sintering and a preparing method thereof.

Description of the Related Art

In recent years, techniques to prepare a prosthesis device by the cutting and machining which uses the dental CAD/CAM system has been spread rapidly and therefore it has been becoming possible to easily prepare prosthetic devices by cutting and machining blanks which are made of ceramic materials such as a zirconia, an alumina and a lithium disilicate or of resin materials such as an acrylic resin and a hybrid resin.

In particular, zirconia has been clinically applied in various cases because of its high strength. On the other hand, a perfect sintered zirconia (hereinafter, also referred to as "zirconia perfect sintered body") has very high hardness and therefore cannot be cut and machined using a dental CAD/CAM system. Thus, a zirconia mill blank for dental cutting and machining which is not fully sintered but is calcined at a low firing temperature to adjust to a hardness that enables to cut has been used.

A general zirconia mill blank for dental cutting and machining is prepared by molding a zirconia powder by press molding or the like and then calcining at 800 to 1200° C.

The properties of the zirconia mill blank for dental cutting and machining, that is, the properties of the zirconia perfect sintered body (fully sintered body) are influenced by the properties of the used zirconia powder.

For example. Patent Document 1 discloses a zirconia mill blank for dental cutting and machining prepared by using a zirconia powder containing 3 mol % of yttrium, and a zirconia perfect sintered body prepared from the zirconia mill blank. Since this sintered body has high strength, it has been clinically applied in a frame of 4 or more unit bridges. However, since this sintered body has low translucency, it has been difficult to reproduce the color tone similar to that of natural tooth.

Patent Document 2 discloses a zirconia mill blank for dental cutting and machining prepared by using a zirconia powder containing 3 mol % of yttrium with a reduced alumina amount and a zirconia perfect sintered body prepared from the zirconia mill blank. Because translucency is improved while maintaining high strength, this sintered body has been clinically applied in a frame of 4 or more unit bridges and a molar tooth portion full crown. However, since translucency is insufficient in the perfect sintered body, it has been difficult to apply to a case where high aesthetics is required such as a front tooth portion.

Patent Document 3 discloses a zirconia blank for dental cutting and machining prepared by using a zirconia powder containing 4 to 6.5 mol % of yttrium, and a zirconia perfect sintered body prepared from the zirconia blank. Since the sintered body has high translucency, the perfect sintered body has been clinically applied to a case where high aesthetics is required such as a front tooth portion. However, the translucency of the perfect sintered body is lower than that of a lithium disilicate material, and therefore it has been insufficient for the application to cases such as an inlay, an onlay and a veneer.

Patent Document 4 discloses a zirconia perfect sintered body using a zirconia powder containing yttrium of 2-7 mol %. Since the sintered body has high translucency similar to a porcelain material or a lithium disilicate material, it is applicable to not only the cases of the front tooth but also the cases such as an inlay, an onlay and a veneer. However, since the hot isostatic pressing (HIP) treatment is essential for the sintered body, it has been difficult to manufacture in the general dental laboratory.

Patent Document 5 discloses a zirconia mill blank for dental cutting and machining having meso pores. Since the zirconia mill blank has high specific surface area, there is an advantage that coloring liquid containing metal ion easily infiltrates. However, since the strength is insufficient, there has been a problem that a chipping and/or a breakage easily occur in cutting a thin workpiece. Furthermore, in a zirconia perfect sintered body prepared from the zirconia mill blank, since a pore easily remain in the zirconia perfect sintered body, it has been difficult to give sufficient strength and translucency.

In addition, a zirconia prosthetic device may be provided by molding a zirconia mill blank for dental cutting and machining into a desired shape by cutting and machining and the like, and perfect sintering by firing at a temperature more than a sintering temperature. In this firing, since a heating up period of several hours or more and a holding period of several hours are required, production efficiency is low, and multiple dental visits are necessary before a patient can mount a prosthesis device.

In late years, a sintering furnace which is available for a firing period from several tens of minutes to several hours has been spread. However, when the conventional zirconia mill blank for dental cutting and machining is sintered for a short period, there has been a problem that translucency and strength are not provided enough.

For example, since translucency and strength of a sintered body prepared by sintering for a short period a zirconia mill blank for dental cutting and machining disclosed in Patent Document 6 are insufficient, it has been difficult to apply to a case that high aesthetic property is required such as a front tooth portion and a case that high strength is required such as a molar tooth portion.

Patent Document 7 discloses a zirconia mill blank for dental cutting and machining of which sufficient translucency is provided in the sintered body by sintering of 15 minutes of holding period. However, since the strength of the sintered body was insufficient, the sintered body has been unsuitable for a case that high strength is required such as a molar tooth portion full crown.

Patent Document 8 discloses a zirconia mill blank for dental cutting and machining which can be sintered in 30 minutes. However, since the translucency of the sintered body was insufficient, and the sintered body has been unsuitable for a case that high aesthetic property is required such as a front tooth portion.

Patent Document 9 discloses a method for providing a zirconia perfect sintered body by sintering for 30 to 90 minutes. However, since the translucency or the strength of the sintered body is insufficient, it has been difficult to apply to a case that high aesthetic property is required such as a front tooth portion and a case that high aesthetic property is required such as a front tooth portion.

RELEVANT REFERENCES

Patent Literature

[Patent Document 1] Japanese Unexamined Patent Application Publication No. JPS 60-235762 A
[Patent Document 2] Japanese Patent No. JP5608976 B
[Patent Document 3] International Publication WO2015/199018
[Patent Document 4] Japanese Patent No. JP5396691 B
[Patent Document 5] Japanese Patent No. JP6321644 B
[Patent Document 6] International Publication WO2015/098765
[Patent Document 7] International Publication WO2018/056330
[Patent Document 8] International Publication WO2018/029244
[Patent Document 9] Chinese Patent No. CN107162603 B

SUMMARY OF THE INVENTION

Technical Problem

An object of the present disclosure is to provide a zirconia mill blank for dental cutting and machining which has excellent machinability in a thin workpiece such as an inlay, an onlay and a veneer, and may impart high strength and high translucency to a zirconia perfect sintered body without a special sintering such as HIP treatment, and a preparing method thereof.

Another object of the present disclosure is to provide a zirconia mill blank for dental cutting and machining which may impart high strength and high translucency to a zirconia perfect sintered body in sintering for a short period, and a preparing method thereof.

Solution to Problem

The present disclosures made a study on a zirconia mill blank for dental cutting and machining which has excellent machinability in a thin workpiece such as an inlay, an onlay and a veneer, and may impart high strength and high translucency to a zirconia perfect sintered body without a special sintering such as HIP treatment. As a result, the present disclosures have found that a pore structure of a zirconia mill blank for dental cutting and machining is particularly important to have excellent machinability in a thin workpiece such as an inlay an onlay and a veneer and to impart high strength and high translucency to a zirconia perfect sintered body.

In addition, the present disclosures made a study on a zirconia mill blank for dental cutting and machining which may impart high strength and high translucency to a zirconia perfect sintered body in sintering for a short period. As a result, the present disclosures have found that a pore structure of a zirconia mill blank for dental cutting and machining is also particularly important to impart high strength and high translucency to a zirconia perfect sintered body in sintering for a short period.

In the zirconia mill blank for dental cutting and machining of the present disclosure, the zirconia mill blank for dental cutting and machining has a porosity within a range of 15 to 30%.

In the present disclosure, it is preferable that the zirconia mill blank for dental cutting and machining contains a zirconia particle containing solid-solved yttrium (a1).

In the present disclosure, it is preferable that an amount of yttrium in the (a1) zirconia particle containing solid solved yttrium is within a range of 3.0 to 6.5 mol % in terms of an oxide in the zirconia mill blank for dental cutting and machining. In this case, high strength and translucency may be imparted to a zirconia perfect sintered body in sintering for a short period.

In the present disclosure, it is preferable that an amount of yttrium in the (a1) zirconia particle containing solid-solved yttrium is within a range of 3.5 to 4.5 mol % in terms of an oxide in the zirconia mill blank for dental cutting and machining.

In the present disclosure, it is preferable that the zirconia mill blank for dental cutting and machining further contains an yttrium compound not solid solved in zirconia (a2).

In the present disclosure, it is preferable that the (a2) yttrium compound not solid-solved in zirconia is in a state of being dispersed on a surface of the zirconia particle containing solid solved yttrium (a1).

In the present disclosure, it is preferable that an amount of yttrium in the (a2) yttrium compound not solid solved in zirconia is within a range of 0.1 to 3.0 mol % in terms of an oxide in the zirconia mill blank for dental cutting and machining.

In the present disclosure, it is preferable that a pore volume of the zirconia mill blank for dental cutting and machining is within a range of 0.03 to 0.07 $cm^3/g$.

In the present disclosure, it is preferable that a specific surface area of the zirconia mill blank for dental cutting and machining is within a range of 1 to 10 $cm^2/g$.

In the present disclosure, it is preferable that a pore diameter of the zirconia mill blank for dental cutting and machining is within a range of 50 to 200 nm.

The preparing method of a zirconia mill blank for dental cutting and machining of the present disclosure comprises a zirconia powder molding process, and a cold isostatic pressing molding process, wherein; the cold isostatic pressing molding process includes at least two or more of a series of processes including an application process applying a load pressure, an increase process increasing the load pressure to a maximum load pressure and a release process releasing the load pressure.

In the present disclosure, it is preferable that the zirconia powder is formed by a press molding.

In the present disclosure, it is preferable that the cold isostatic pressing molding process includes a holding process holding a maximum load pressure.

In the present disclosure, it is preferable that a difference between a maximum load pressure and a load pressure after releasing is at least 50 MPa or more.

In the present disclosure, it is preferable that the preparing method further comprises after the cold isostatic pressing molding process: a disperse process dispersing an yttrium compound on a zirconia particle containing solid-solved yttrium.

In the present disclosure, it is preferable that the preparing method includes at least ten or more of the series of processes including the application process applying a load pressure, the increase process increasing the load pressure to a maximum load pressure and the release process releasing the load pressure.

In the present disclosure, sintering for a short period preferably means a sintering period of 90 minutes or less.

In the present disclosure, the zirconia mill blank for dental cutting and machining consists of a zirconia particle containing a solid-solved yttrium.

Advantageous Effects of Invention

The zirconia mill blank for dental cutting and machining and the preparing method thereof according to the present disclosure may have excellent machinability in a thin workpiece such as an inlay, an onlay and a veneer, and may impart high strength and high translucency to a zirconia perfect sintered body without a special sintering such as HIP treatment.

DETAILED DESCRIPTION OF THE PREFERRED EMBODIMENTS

Hereinafter, specific embodiments of the requirements of the present disclosure will be described in detail.

The present disclosure has a feature that the zirconia mill blank for dental cutting and machining has an appropriate pore structure and a porosity within a range of 15 to 30%. The zirconia mill blank for dental cutting and machining of the present disclosure may have excellent machinability in a thin workpiece such as an inlay, an onlay and a veneer, and may impart translucency like an enamel of a natural tooth to a zirconia perfect sintered body, in spite of sintering at an ordinary pressure.

Preferably, the zirconia mill blank for dental cutting and machining of the present disclosure is a zirconia mill blank for dental cutting and machining containing both a zirconia particle containing solid-solved yttrium (a1) and a yttrium compound not solid-solved in zirconia (a2) and the (a2) yttrium compound not solid-solved in zirconia is in a state of being dispersed on a surface of the zirconia particle containing solid-solved yttrium (a1). More preferably, the zirconia mill blank for dental cutting and machining of the present disclosure is a zirconia mill blank for dental cutting and machining consisting of the (a1) zirconia particle containing solid-solved yttrium and the (a2) yttrium compound not solid-solved in zirconia.

Preferably, the zirconia mill blank for dental cutting and machining of the present disclosure is a zirconia mill blank for dental cutting and machining consisting of a zirconia particle containing solid-solved yttrium. Such zirconia mill blank for dental cutting and machining may impart strength and translucency like a conventional sintered body by sintering in a long period, in spite of sintering for a short period.

A porosity of the zirconia mill blank for dental cutting and machining in the present disclosure is within a range of 15 to 30%, and preferably within a range of 22 to 27%. The porosity of the zirconia mill blank for dental cutting and machining in the present disclosure is calculated from following formula (1).

$$\text{Porosity (\%)} = \text{pore volume}/(\text{pore volume} + \text{skeleton volume}) \times 100 \quad (1)$$

When the porosity is more than 30% or less than 15%, it is not preferable because chipping resistance of the zirconia mill blank for dental cutting and machining may lower or sufficient translucency may be not imparted to the zirconia perfect sintered body.

A porosity of the zirconia mill blank for dental cutting and machining of the present disclosure is substantially different from relative density calculated from theoretical density. The relative density calculated from theoretical density means a value calculated from the density including all pores from a micro pore to a macro pore, in addition to a closed pore. On the other hand, the porosity of the present disclosure is decided based on the pore volume measured by the mercury intrusion method, and therefore means a value decided by measuring a continuous hole which has a diameter of about 5 nm to 250 μm and does not include a closed pore. It has been found that the porosity decided based on pore volume measured by the mercury intrusion method in the present disclosure is particularly important for machinability of the zirconia mill blank for dental cutting and machining and to impart high translucency to a zirconia perfect sintered body which is sintered by an ordinary pressure sintering. The presence or absence of a micro pore having a diameter less than 5 nm is unrelated in imparting translucency to the zirconia perfect sintered body because the micro pore having a diameter less than 5 nm hardly remains in sintering. On the other hand, it is preferable that a micro pore having a diameter more than 250 μm is not substantially included because chipping resistance on cutting and machining may be lowered or translucency of the perfect sintered body may be lowered.

As the zirconia particle containing solid-solved yttrium (a1) of the present disclosure, any known zirconia particle containing solid-solved yttrium prepared from known zirconia powder may be used without any limitations. Specifically, it is preferable that zirconia powder used in the present disclosure is prepared by the hydrolysis method. More specifically, the zirconia powder is prepared by a method which comprises heating a solution in which a zirconium salt and an yttrium compound are mixed and dissolved to cause a hydrolysis reaction, and firing the generated sol. The preparing method of the (a1) zirconia particle containing solid-solved yttrium of the present disclosure is not particularly limited, but it is preferably prepared by firing the above zirconia powder at 800 to 1200° C.

An amount of yttrium in the (a1) zirconia particle containing solid-solved yttrium is preferably within a range of 3.0 to 6.5 mol % in terms of an oxide in the zirconia mill blank for dental cutting and machining, and more preferably within a range of 3.5 to 4.5 mol %. When the amount of yttrium is less than 3.0 mol %, it is not preferable because sufficient translucency may be not imparted after perfect sintering of zirconia. On the other hand, when the amount of yttrium exceeds 6.5 mol %, it is not preferable because it may be difficult to impart sufficient strength although translucency of the zirconia perfect sintered body is improved.

It is preferable that a primary particle diameter of the zirconia powder of the present disclosure is within a range of 1 to 500 nm. When the primary particle diameter is less than 1 nm, it is not preferable because it may be difficult to impart sufficient strength although translucency of the zirconia perfect sintered body is improved. On the other hand, when the primary particle diameter is more than 500 nm, it is not preferable because it may be difficult to impart sufficient strength to the zirconia perfect sintered body.

It is preferable that a specific surface area of the zirconia powder of the present disclosure is within a range of 1 to 10 $m^2/g$. When the specific surface area is less than 1 $m^2/g$, it is not preferable because sufficient translucency may be not imparted after perfect sintering of the zirconia. On the other hand, when the specific surface area is more than 10 $m^2/g$, it is not preferable because it may be difficult to impart sufficient strength although translucency after perfect sintering of zirconia is improved.

As the (a2) yttrium compound not solid-solved in zirconia of the present disclosure, any known yttrium compounds may be used without any limitations. Specifically, it is preferable that the yttrium compound used in the present disclosure is a water-soluble compound consisting of any one of a halogen compound, a nitrate, a sulfate and an organic acid salt (in which a carbonate is contained) of an yttrium oxide and/or yttrium. Specific examples of the water soluble yttrium compound include yttrium chloride, yttrium nitrate, yttrium acetate, yttrium carboxylate, yttrium sulfate and yttrium carbonate.

Among water-soluble yttrium compounds, an yttrium compound of an organic acid salt (in which a carbonate is contained) is particularly preferable from the viewpoint of low decomposition temperature and suppressing the contamination of the firing furnace. Specific examples include yttrium acetate and yttrium carboxylate. The decomposition temperature of organic acid salt is lower than that of inorganic salt such as halogen compound, nitrate and sulfate and the organic acid salt decomposes at low temperature in comparison with the inorganic salt. When the decomposition temperature is high, it may be difficult to impart sufficient translucency and strength to the zirconia perfect sintered body because the pore remains in a sintering process.

An amount of yttrium contained in the (a2) yttrium compound not solid-solved in zirconia of the present disclosure is preferably within a range of 0.1 to 3.0 mol % in terms of an oxide in the zirconia mill blank for dental cutting and machining. When the amount of yttrium is less than 0.1 mol %, it is not preferable because sufficient translucency may be not imparted after perfect sintering of the zirconia. On the other hand, when the amount of yttrium exceeds 3.0 mol %, it is not preferable because it may be difficult to impart sufficient strength although translucency of the zirconia perfect sintered body is improved.

In the zirconia mill blank for dental cutting and machining of the present disclosure, a composition molar ratio of the (a1) zirconia particle containing solid-solved yttrium and the (a2) yttrium compound not solid-solved in zirconia is preferably within a range of (a1):(a2)=1:1 to 65:1, more preferably 3:1 to 20:1. When the (a1) exceeds 65 for 1 of the (a2) in the above molar ratio, it is not preferable because it may be difficult to impart sufficient strength although the translucency of the zirconia perfect sintered body is improved. On the other hand, when the (a1) is lower than 1 for 1 of the (a2) in the above molar ratio, it is not preferable because sufficient translucency may be not imparted after perfect sintering of the zirconia.

It is preferable that the (a2) yttrium compound not solid-solved in zirconia is in a state of being dispersed on a surface of the zirconia particle containing solid-solved yttrium (a1).

The state of being dispersed on a surface in the present disclosure means a state in which an yttrium compound is carried and/or adsorbed on a part and/or the whole of the zirconia primary particle.

It has been found that the state in which the (a2) yttrium compound not solid-solved in zirconia is dispersed on a surface of the zirconia particle containing solid-solved yttrium (a1) is important to impart high machinability to the zirconia mill blank for dental cutting and machining and impart high translucency and strength to the zirconia perfect sintered body.

Although these reasons are not clear, with respect to the reason for imparting high machinability to the zirconia mill blank for dental cutting and machining, it is considered that the yttrium compound not solid-solved in zirconia reinforces a neck portion between the zirconia primary particles. Since the zirconia mill blank for dental cutting and machining is usually in a state of semi sintered, the strength of the neck portion between the zirconia primary particles is low. Therefore, chipping and breakage occur at the time of processing of thin workpiece. On the other hand, it is considered that the neck portion in the zirconia mill blank for dental cutting and machining of the present disclosure is in a state of being reinforced by the yttrium compound and therefore good machinability may be imparted in cutting of a thin workpiece.

Furthermore, for the reason that high translucency is imparted to the zirconia perfect sintered body, it is considered that because the yttrium compound which is solid-solved in zirconia is dispersed on a surface of the zirconia, the dispersed yttrium compound is segregated in the vicinity of the grain boundary in a sintering process, and then promotes the phase transition of the crystal phase (from tetragonal to cubic) in the vicinity of the grain boundary. Furthermore, it is considered that the state in which the yttrium compound is dispersed on a surface of the zirconia particle also provides an effect of reducing a residue of a closed pore in a sintering process to achieve both high translucency and strength of the zirconia perfect sintered body.

The zirconia mill blank for dental cutting and machining of the present disclosure may contain a coloring material. Specific examples include iron oxide which may impart yellow color and erbium which may impart red color. In addition to these coloring materials, there is no problem even if a coloring material containing element such as cobalt, manganese and chromium is used in combination for a color tone adjustment.

The zirconia mill blank for dental cutting and machining of the present disclosure may contain a sintering aid. Specifically, for the purpose of improving the sinterability and suppressing low temperature deterioration, it is preferable to contain 0.01 to 0.3 wt. % of alumina. When the amount of alumina is less than 0.01 wt. %, it is not preferable because the zirconia perfect sintered body may be not sintered sufficiently and therefore sufficient strength and translucency may be not imparted. On the other hand, when the amount of alumina exceeds 0.3 wt. %, it is not preferable because it may be difficult to impart sufficient translucency although strength of the zirconia perfect sintered body is improved.

It is preferable that a crystal phase of the zirconia mill blank for dental cutting and machining of the present disclosure is tetragonal phase and/or cubic crystal. When the crystal phase is monoclinic phase, it is not preferable because sufficient translucency may be not imparted after perfect sintering of zirconia.

The specific surface area of the zirconia mill blank for dental cutting and machining of the present disclosure means a value measured by the nitrogen adsorption method. The specific surface area of the zirconia mill blank for dental cutting and machining of the present disclosure is preferably within a range of 1 to 10 $m^2/g$. When the specific surface area is less than 1 $m^2/g$, it is not preferable because sufficient translucency may be not imparted to the zirconia perfect sintered body. On the other hand, when the specific surface area is more than 10 $m^2/g$, it is not preferable because sufficient strength may be not imparted to the zirconia perfect sintered body.

The pore volume of the zirconia mill blank for dental cutting and machining of the present disclosure is measured by the mercury intrusion method. In the pore volume measured by the mercury intrusion method, micro pores having a diameter of about 5 nm to 250 μm are measured. The pore volume of the zirconia mill blank for dental cutting and machining of the present disclosure is preferably within a range of 0.03 to 0.07 $cm^3/g$. When the pore volume is less than 0.03 $cm^3/g$, it is not preferable because sufficient translucency may be not imparted to the zirconia perfect sintered body. On the other hand, when the pore volume is more than 0.07 $cm^3/g$, it is not preferable because sufficient strength may be not imparted to the zirconia perfect sintered body.

The pore diameter of the zirconia mill blank for dental cutting and machining of the present disclosure means a diameter of the micro pore in the median value of the pore volume measured by the mercury intrusion method. The pore diameter of the zirconia mill blank for dental cutting and machining of the present disclosure is preferably within a range of 50 to 200 nm. When the pore diameter is less than 50 nm, it is not preferable because sufficient translucency may be not imparted to the zirconia perfect sintered body. On the other hand, when the pore diameter is more than 200 nm, it is not preferable because sufficient strength and translucency may be not imparted to the zirconia perfect sintered body.

A skeleton volume of the zirconia mill blank for dental cutting and machining of the present disclosure means a value calculated from a true density measured by the gas phase substitution method. Further, the skeleton volume of the present disclosure means a value calculated by the formula: skeleton volume ($cm^3/g$)=1/true density ($g/cm^3$). Because the skeleton volume is calculated by the gas phase substitution method which uses a gas, the feature of the skeleton volume is that the value of the skeleton volume contains a continuous-hole containing a fine pore in comparison with the value measured by the liquid phase substitution method. The skeleton volume of the zirconia mill blank for dental cutting and machining of the present disclosure is preferably within a range of 0.16 to 0.17 $cm^3/g$. When the skeleton volume is less than 0.16 $cm^3/g$, it is not preferable because sufficient translucency may be not imparted. On the other hand, when the skeleton volume is more than 0.17 $cm^3/g$, it is not preferable because sufficient strength may be not imparted to the zirconia perfect sintered body.

A Vickers hardness of the zirconia mill blank for dental cutting and machining of the present disclosure is preferably within a range of 30 to 150 Hv0.2. When the Vickers hardness is less than 30 Hv0.2, it is not preferable because chipping and breakage easily occur in the cutting and machining. On the other hand, when the Vickers hardness is more than 150 Hv0.2, it is not preferable because a milling bar of a milling machine is heavily consumed to raise a running cost.

A bending strength of the zirconia mill blank for dental cutting and machining of the present disclosure is preferably within a range of 25 to 150 MPa. When the bending strength is less than 25 MPa, it is not preferable because chipping and breakage easily occur in the cutting and machining. On the other hand, when the bending strength is more than 150 MPa, it is not preferable because a milling bar of a milling machine is heavily consumed to raise a running cost.

A preparing method of the zirconia mill blank for dental cutting and machining of the present disclosure is not particularly limited, and any known preparing methods can be used without any problem. Specifically, it is preferable to be prepared by molding a zirconia powder by a press molding. Furthermore, it is more preferable to be prepared by a multilayer molding in which zirconia powders having different color tones or compositions are press-molded in multiple stages.

The zirconia mill blank for dental cutting and machining of the present disclosure is preferably subjected to isostatic pressing by cold isostatic pressing (CIP molding-treatment) after the press molding.

The maximum load pressure of the CIP molding-treatment in the present disclosure is preferably 50 MPa or more. When the maximum load pressure is less than 50 MPa, it is not preferable because sufficient translucency and strength may be not imparted to the zirconia perfect sintered body.

The presence or absence of the holding of the maximum load pressure of the CIP molding-treatment and the holding period of the present disclosure are not particularly limited, but the holding period is preferably within a range of 0 (no hold) to 150 seconds and more preferably within a range of 0 to 60. In the present disclosure, holding means that any load pressure is maintained.

In the CIP molding-treatment of the present disclosure, a series of processes which includes an application of a load pressure, a holding a maximum load pressure and a releasing the load pressure is repeated preferably two times, more preferably five times, and most preferably ten times. It is possible to reduce the size of a pore to an appropriate size by repeating the above series of processes. In addition, the method in which the maximum load pressure is increased in multiple stages and the load pressure is released can be used. When the number of times of repeat of the series of processes is 1 or less, it is not preferable because sufficient translucency and strength may be not imparted to the zirconia perfect sintered body.

A time period required for the above series of processes is not particularly limited, but is usually preferably within a range of 30 seconds to 10 minutes and is more preferably within a range of 3 minutes to 7 minutes. When the time period is too short, a molding body may be destroyed, and when the time period is too long, production efficiency worsens, and therefore these are not preferable.

A difference between the maximum load pressure and the pressure after releasing is preferably at least 50 MPa or more, more preferably 100 MPa or more, more preferably 200 MPa or more. When the release pressure is less than 50 MPa, it is not preferable because sufficient translucency and strength may be not imparted to the zirconia perfect sintered body.

The repetitive CIP treatment of the present disclosure may include a degreasing process on the way. A method of degreasing is not particularly limited, but a degreasing by the general heat treatment is preferable because special facilities are not required. The degreasing temperature is not particularly limited, but preferably within a range of 300 to 800° C. When the degreasing temperature is less than 300° C. a binder may not be removed enough and when the degreasing temperature is more than 800° C. sintering may be partially progressed and therefore an effect of the repetitive CIP treatment may be not provided and thus these are not preferable.

A temporary-firing temperature of the zirconia mill blank for dental cutting and machining of the present disclosure is preferably within a range of 800 to 1200° C. When the temporary-firing temperature is less than 800° C. it is not preferable because Vickers hardness and/or bending strength become too low and therefore chipping and breakage easily occur in the cutting and machining. On the other hand, when the temporary-firing temperature is more than 1200° ° C. it is not preferable because Vickers hardness and/or bending strength become too high and therefore a milling bar of a milling machine is heavily consumed to raise a running cost.

The (a2) yttrium compound not solid-solved in zirconia in the present disclosure is preferably in a state of being dispersed on a surface of the zirconia particle. In the present disclosure, the state of being dispersed means a state in which a coarse particle is not presence, and preferably a particle of 100 nm or more is not presence, more preferably a particle of 100 nm or more is not presence. Examples of method for confirming the state of being dispersed include TEM-EDS observation. Examples of method for dispersing an yttrium compound on a surface of the zirconia include a method which comprises spraying and/or contacting an yttrium-containing solution in which a water-soluble yttrium compound is dissolved in water on the zirconia powder and/or the zirconia mill blank for dental cutting and machining, and thereafter drying. Because the yttrium compound coated by this method is carried and/or adsorbed on a surface of zirconia primary particle at an element level and is easily solid-solved in zirconia in a sintering process, this method is preferable.

An amount of the yttrium compound which is used in dispersing the yttrium compound on a surface of the zirconia is preferably within a range of 1 to 60 wt. %, more preferably within a range of 5 to 30 wt. %. When the amount of the yttrium compound is less than 1 wt. %, it is not preferable because sufficient yttrium compound may be not dispersed on the zirconia powder and/or zirconia mill blank for dental cutting and machining. On the other hand, when the amount of the yttrium compound is more than 60 wt. %, it is not preferable because the amount of yttrium compound becomes excessive.

A preparation method of the yttrium containing solution of the present disclosure is not particularly limited, and any methods can be used without any problems as long as a water-soluble yttrium compound is dissolved in water.

A method for spraying and/or contacting the yttrium-containing solution on the zirconia powder of the present disclosure is not particularly limited, and any methods can be used without any problems as long as the yttrium containing solution is dispersed on a zirconia primary particle.

It is preferable that a dry process is included for removing water after spraying and/or contacting the yttrium containing solution to the zirconia powder of the present disclosure. A method for drying is not particularly limited, and any methods can be used without any problems as long as the method comprises temperature or period necessary to remove water.

A method for contacting the zirconia mill blank for dental cutting and machining of the present disclosure with the yttrium containing solution is not particularly limited as long as the yttrium containing solution can infiltrate into the gap of the zirconia mill blank. In a simple and preferable method, the whole and/or a part of the zirconia mill blank is immersed in the yttrium-containing solution. When the whole and/or a part of the zirconia mill blank is immersed in the yttrium-containing solution, the yttrium-containing solution can infiltrate by the capillarity into an inside of the zirconia mill blank.

As a specific method for immersing the zirconia mill blank for dental cutting and machining of the present disclosure in the yttrium-containing solution. 1 to 100% of the total volume of the zirconia mill blank is preferably immersed in the yttrium-containing solution, and 10 to 100% is more preferably immersed. By controlling the immersion volume of the zirconia mill blank in the yttrium containing solution, the yttrium compound can be dispersed only in an arbitrary part of the zirconia mill blank for dental cutting and machining.

A specific atmosphere in which the zirconia mill blank for dental cutting and machining of the present disclosure is immersed in the yttrium containing solution is not particularly limited, and can be any of an ordinary pressure atmosphere, a reduced pressure atmosphere and a pressurized atmosphere without any problems. From the viewpoint of shortening the preparation period, the surrounding environment is in a reduced pressure atmosphere or a pressurized atmosphere in a preferable means because the infiltration of the yttrium containing solution is promoted. In addition, it is effective for shortening the period of the step in which the yttrium-containing solution infiltrates into an inside of the zirconia mill blank for dental cutting and machining to repeat multiple times the operation of returning to an ordinary pressure after the pressure reduction operation (pressure reduction/ordinary pressure operation).

A period for immersing the zirconia mill blank for dental cutting and machining in the yttrium containing solution is not determined unconditionally and can be adjusted appropriately based on the density of the zirconia mill blank, the molded body size of the zirconia mill blank and the degree of infiltration and the method for immersing of the yttrium-containing solution and the like. For example, the period for immersing is usually 1 to 72 hours in the case of immersing, the period for immersing is usually 1 minute to 6 hours in the case of immersing under reduced pressure, and the period for immersing is usually 1 minute to 6 hours in the case of contacting under pressurization.

It is preferable to take out the zirconia mill blank from the yttrium containing solution and to perform a drying step of the yttrium containing solution after the yttrium-containing solution infiltrates into the zirconia mill blank for dental cutting and machining. The drying step is not particularly limited, but a simple and preferable method is to dry under an ordinary pressure atmosphere. The drying temperature is not particularly limited, but is preferably within a range of 25 to 1200° C. and more preferably within a range of 25 to 1100° C. The drying period is not particularly limited, but is usually within a range of 30 minutes to 72 hours.

The zirconia mill blank for dental cutting and machining can be prepared by the method of the present disclosure. The prepared zirconia mill blank for dental cutting and machining is severed, cut, and polished so as to have a desired size as necessary.

A method for perfect sintering the zirconia mill blank for dental cutting and machining of the present disclosure is not particularly limited, but a simple and preferred method is the firing at an ordinary pressure. A firing temperature is not particularly limited, but is preferably within a range of 1450 to 1600° C. and more preferably within a range of 1500 to 1600° C. A holding period at the maximum firing temperature is not particularly limited, but is preferably within a range of 1 minute to 12 hours, and more preferably within a range of 2 to 4 hours. A temperature increase rate is not particularly limited, but is preferably within a range of 1 to 400° C./min, and more preferably within a range of 3 to 100° C./h.

When the amount of yttrium is within a range of 3.0 to 6.5 mol % in terms of an oxide in the zirconia mill blank for dental cutting and machining of the present disclosure, sintering for a short period may be used as the method of perfect sintering. In this case, a firing temperature is not particularly limited, but is preferably within a range of 1450 to 1600° C. and more preferably within a range of 1500 to 1600° C. A holding period at the maximum firing temperature is not particularly limited, but is preferably within a range of 1 minute to 1 hours, and more preferably within a range of 2 minutes to 10 minutes. A temperature increase rate is not particularly limited, but is preferably within a range of 5 to 400° C./min. and more preferably within a range of 50 to 300° ° C./min.

The kind of a prosthesis device prepared by cutting and machining the zirconia mill blank for dental cutting and machining of the present disclosure is not limited particularly, and there is no problem at all even if the prosthesis device is any of an inlay, a laminate, a crown, a bridge and the like. Therefore, a shape of the zirconia blank for dental cutting and machining which is to be cut and machined for preparing a prosthesis device is not limited particularly, and any zirconia blank for dental cutting and machining can be used even if the zirconia mill blank for dental cutting and machining has any shape such as a block shape corresponding to an inlay, a laminate, a crown and the like and a disk shape corresponding to a bridge.

EXAMPLES

Hereinafter, the present disclosure is described by way of Examples in more detail, and specifically, but the present disclosure is not limited to these Examples.

Examples 1 to 19 and Comparative Examples 1 to 6

[Preparation of Yttrium Containing Solution]

Tables 1 to 2 show the composition tables of yttrium containing solution. The yttrium containing solution was prepared by adding each yttrium compound to ion-exchanged water and stirring and mixing for 12 hours while heating at 80° C.

TABLE 1

| | Y1 | Y2 | Y3 | Y4 | Y5 |
|---|---|---|---|---|---|
| Yttrium acetate (g) | 10 | 15 | | 1 | |
| Yttrium chloride (g) | | | 50 | 10 | 10 |
| Yttrium carbonate (g) | | | | | |
| Ion exchanged water (g) | 90 | 85 | 50 | 89 | 90 |

TABLE 2

| | Y6 | Y7 |
|---|---|---|
| Yttrium acetate (g) | | |
| Yttrium chloride (g) | | 60 |
| Yttrium carbonate (g) | 10 | |
| Ion exchanged water (g) | 90 | 40 |

[Preparation of Zirconia Mill Blank (D1)]

Zirconia powder containing 5.5 mol % of solid-solved yttrium oxide (Zpex SMILE: manufactured by Tosoh Corporation) was filled in a mold (φ100 mm), and press molding (surface pressure: 50 MPa) was performed to obtain a molded body. Further, the molded body was subjected to CIP molding (maximum load pressure: 200 MPa, load pressure after releasing: 0 MPa, holding period of maximum load pressure: 1 minute, the number of times of repeat: 10 times). Thereafter, calcination was performed in an electric furnace (1000° ° C., 30 minutes) to prepare a temporary fired body. The temporary fired body was immersed in the yttrium containing solution (Y1) in an ordinary pressure atmosphere for 24 hours. Thereafter, the temporary fired body was taken out from the yttrium containing solution, and dried (100° ° C., 30 minutes) after removing water under an ordinary pressure environment to prepare Zirconia mill blank (D1).

[Preparation of Zirconia Mill Blank (D2)]

Zirconia powder containing 5.5 mol % of solid-solved yttrium oxide (Zpex SMILE: manufactured by Tosoh Corporation) was filled in a mold (φ100 mm), and press molding (surface pressure: 50 MPa) was performed to obtain a molded body. Further, the molded body was subjected to CIP molding (maximum load pressure: 200 MPa, load pressure after releasing: 0 MPa, holding of maximum load pressure: none, the number of times of repeat: 10 times). Thereafter, calcination was performed in an electric furnace (1200° C. 30 minutes) to prepare a temporary fired body. The temporary fired body was immersed in the yttrium-containing solution (Y1) in an ordinary pressure atmosphere for 12 hours. Thereafter, the temporary fired body was taken out from the yttrium containing solution, and dried (25° C. 72 hours) after removing water under an ordinary pressure environment to prepare Zirconia mill blank (D2).

[Preparation of Zirconia Mill Blank (D3)]

Zirconia powder containing 5.5 mol % of solid-solved yttrium oxide (Zpex SMILE: manufactured by Tosoh Corporation) was filled in a mold (φ100 mm), and press molding (surface pressure: 50 MPa) was performed to obtain a molded body. Further, the molded body was subjected to CIP molding (maximum load pressure: 200 MPa, load pressure after releasing: 0 MPa, holding of maximum load pressure: none, the number of times of repeat: 10 times). Thereafter, calcination was performed in an electric furnace (1000° C. 30 minutes) to prepare a temporary fired body. The temporary fired body was immersed in the yttrium-containing solution (Y2) in an ordinary pressure atmosphere for 1 hour. Thereafter, the temporary fired body was taken out from the yttrium-containing solution, and dried (850° C. 30 minutes) after removing water under an ordinary pressure environment to prepare Zirconia mill blank (D3).

[Preparation of Zirconia Mill Blank (D4)]

Zirconia powder containing 5.5 mol % of solid-solved yttrium oxide (Zpex SMILE: manufactured by Tosoh Corporation) was filled in a mold (φ100 mm), and press molding (surface pressure: 50 MPa) was performed to obtain a molded body. Further, the molded body was subjected to CIP molding (maximum load pressure: 200 MPa, load pressure after releasing: 0 MPa, holding period of maximum load pressure: 3 minute, the number of times of repeat: 10 times). Thereafter, calcination was performed in an electric furnace (900° C. 30 minutes) to prepare a temporary fired body. The temporary fired body was immersed in the yttrium-containing solution (Y1) in an ordinary pressure atmosphere for 72 hours. Thereafter, the temporary fired body was taken out from the yttrium-containing solution, and dried (900° ° C. 30 minutes) after removing water under an ordinary pressure environment to prepare Zirconia mill blank (D4).

[Preparation of Zirconia Mill Blank (D5)]

Zirconia powder containing 3.0 mol % of solid-solved yttrium oxide (Zpex: manufactured by Tosoh Corporation) was filled in a mold (φ100 mm), and press molding (surface pressure: 50 MPa) was performed to obtain a molded body. Further, the molded body was subjected to CIP molding (maximum load pressure: 200 MPa, load pressure after releasing: 0 MPa, holding period of maximum load pressure: 1 minute, the number of times of repeat: 10 times). Thereafter, calcination was performed in an electric furnace (1000° C. 30 minutes) to prepare a temporary fired body. The temporary fired body was immersed in the yttrium-containing solution (Y3) in an ordinary pressure atmosphere for 12 hours. Thereafter, the temporary fired body was taken out from the yttrium-containing solution, and dried (120° ° C. 30 minutes) after removing water under an ordinary pressure environment to prepare Zirconia mill blank (D5).

[Preparation of Zirconia Mill Blank (D6)]

Zirconia powder containing 6.5 mol % of solid-solved yttrium oxide was filled in a mold (φ100 mm), and press molding (surface pressure: 50 MPa) was performed to obtain a molded body. Further, the molded body was subjected to CIP molding (maximum load pressure: 200 MPa, load pressure after releasing: 0 MPa, holding of maximum load pressure: none, the number of times of repeat: 10 times). Thereafter, calcination was performed in an electric furnace (1000° C. 30 minutes) to prepare a temporary fired body. The temporary fired body was immersed in the yttrium-containing solution (Y4) in an ordinary pressure atmosphere for 72 hours. Thereafter, the temporary fired body was taken out from the yttrium-containing solution, and dried (1000° C. 30 minutes) after removing water under an ordinary pressure environment to prepare Zirconia mill blank (D6).

[Preparation of Zirconia Mill Blank (D7)]

Zirconia powder containing 5.5 mol % of solid-solved yttrium oxide (Zpex SMILE: manufactured by Tosoh Corporation) was filled in a mold (φ100 mm), and press molding (surface pressure: 50 MPa) was performed to obtain a molded body. Further, the molded body was subjected to CIP molding (maximum load pressure: 200 MPa, load pressure after releasing: 0 MPa, holding period of maximum load pressure: 1 minute, the number of times of repeat: 2 times). Thereafter, calcination was performed in an electric furnace (1000° C. 30 minutes) to prepare a temporary fired body. The temporary fired body was immersed in the yttrium-containing solution (Y1) in an ordinary pressure atmosphere for 12 hours. Thereafter, the temporary fired body was taken out from the yttrium-containing solution, and dried (100° C. 30 minutes) after removing water under an ordinary pressure environment to prepare Zirconia mill blank (D7).

[Preparation of Zirconia Mill Blank (D8)]

Zirconia powder containing 5.5 mol % of solid-solved yttrium oxide (Zpex SMILE: manufactured by Tosoh Corporation) was filled in a mold (φ100 mm), and press molding (surface pressure: 50 MPa) was performed to obtain a molded body. Further, the molded body was subjected to CIP molding (maximum load pressure: 200 MPa, load pressure after releasing: 0 MPa, holding period of maximum load pressure: 1 minute, the number of times of repeat: 30 times). Thereafter, calcination was performed in an electric furnace (1000° C. 30 minutes) to prepare a temporary fired body. The temporary fired body was immersed in the yttrium-containing solution (Y1) in a reduced pressure atmosphere for 10 minutes. Thereafter, the temporary fired body was taken out from the yttrium containing solution, and dried (1000° ° C. 30 minutes) after removing water under an ordinary pressure environment to prepare Zirconia mill blank (D8).

[Preparation of Zirconia Mill Blank (D9)]

Zirconia powder containing 5.5 mol % of solid-solved yttrium oxide (Zpex SMILE: manufactured by Tosoh Corporation) was filled in a mold (φ100 mm), and press molding (surface pressure: 50 MPa) was performed to obtain a molded body. Further, the molded body was subjected to CIP molding (maximum load pressure: 50 MPa, load pressure after releasing: 0 MPa, holding period of maximum load pressure: 1 minute, the number of times of repeat: 10 times). Thereafter, calcination was performed in an electric furnace (1000° C. 30 minutes) to prepare a temporary fired body. The temporary fired body was immersed in the yttrium-containing solution (Y1) in a pressurized atmosphere for 24 hours. Thereafter, the temporary fired body was taken out from the yttrium-containing solution, and dried (100° C. 30 minutes) after removing water under an ordinary pressure environment to prepare Zirconia mill blank (D9).

[Preparation of Zirconia Mill Blank (D10)]

Zirconia powder containing 5.5 mol % of solid-solved yttrium oxide (Zpex SMILE: manufactured by Tosoh Corporation) was filled in a mold (φ100 mm), and press molding (surface pressure: 50 MPa) was performed to obtain a molded body. Further, the molded body was subjected to CIP molding (maximum load pressure: 200 MPa, load pressure after releasing: 0 MPa, holding period of maximum load pressure: 1 minute, the number of times of repeat: 10 times). Thereafter, calcination was performed in an electric furnace (1000° ° C. 30 minutes) to prepare a temporary fired body. The temporary fired body was immersed in the yttrium-containing solution (Y5) in an ordinary pressure atmosphere for 36 hours. Thereafter, the temporary fired body was taken out from the yttrium-containing solution, and dried (100° C. 30 minutes) after removing water under an ordinary pressure environment to prepare Zirconia mill blank (D10).

[Preparation of Zirconia Mill Blank (D11)]

Zirconia powder containing 5.5 mol % of solid-solved yttrium oxide (Zpex SMILE: manufactured by Tosoh Corporation) was filled in a mold (φ100 mm), and press molding (surface pressure: 50 MPa) was performed to obtain a molded body. Further, the molded body was subjected to CIP molding (maximum load pressure: 200 MPa, load pressure after releasing: 0 MPa, holding period of maximum load pressure: 1 minute, the number of times of repeat: 10 times). Thereafter, calcination was performed in an electric furnace (1000° C. 30 minutes) to prepare a temporary fired body. The temporary fired body was immersed in the yttrium containing solution (Y6) in an ordinary pressure atmosphere for 12 hours. Thereafter, the temporary fired body was taken out from the yttrium-containing solution, and dried (1000° ° C. 30 minutes) after removing water under an ordinary pressure environment to prepare Zirconia mill blank (D11).

[Preparation of Zirconia Mill Blank (D12)]

The yttrium-containing solution (Y1): 20 g was sprayed to zirconia powder containing 4.0 mol % of solid-solved yttrium oxide: 100 g. and the zirconia powder was dried for removing water under an ordinary pressure environment. The dried zirconia powder was filled in a mold (φ100 mm), and press molding (surface pressure: 50 MPa) was performed to obtain a molded body. Further, the molded body was subjected to CIP molding (maximum load pressure: 200 MPa, load pressure after releasing: 0 MPa, holding period of maximum load pressure: 1 minute, the number of times of repeat: 10 times). Thereafter, calcination was performed in an electric furnace (1000° C. 30 minutes) to prepare Zirconia mill blank (D12).

[Preparation of Zirconia Mill Blank (D13)]

The yttrium-containing solution (Y2): 20 g was sprayed to zirconia powder containing 4.0 mol % of solid-solved yttrium oxide: 100 g. and the zirconia powder was dried for removing water under an ordinary pressure environment. The dried zirconia powder was filled in a mold (φ100 mm) and press molding (surface pressure: 50 MPa) was performed to obtain a molded body. Further, the molded body was subjected to CIP molding (maximum load pressure: 200 MPa, load pressure after releasing: 0 MPa, holding period of maximum load pressure: 1 minute, the number of times of repeat: 10 times). Thereafter, calcination was performed in an electric furnace (1000° C. 30 minutes) to prepare Zirconia mill blank (D13).

[Preparation of Zirconia Mill Blank (D14)]

Zirconia powder containing 5.5 mol % of solid-solved yttrium oxide (Zpex SMILE: manufactured by Tosoh Corporation) was filled in a mold (φ100 mm), and press molding (surface pressure: 50 MPa) was performed to obtain a molded body. Further, the molded body was subjected to CIP molding (maximum load pressure: 200 MPa, load pressure after releasing: 0 MPa, holding period of maximum load pressure: 1 minute, the number of times of repeat: 10 times). Thereafter, calcination was performed in an electric furnace (1000° C. 30 minutes) to prepare Zirconia mill blank (D14).

[Preparation of Zirconia Mill Blank (D15)]

Zirconia powder containing 2.0 mol % of solid-solved yttrium oxide (Zpex SMILE: manufactured by Tosoh Corporation) was filled in a mold (φ100 mm), and press molding (surface pressure: 50 MPa) was performed to obtain a molded body. Further, the molded body was subjected to CIP molding (maximum load pressure: 200 MPa, load pressure after releasing: 0 MPa, holding of maximum load pressure: none, the number of times of repeat: 10 times). Thereafter, calcination was performed in an electric furnace (1000° C. 30 minutes) to prepare a temporary fired body. The temporary fired body was immersed in the yttrium-containing solution (Y1) in an ordinary pressure atmosphere for 12 hours. Thereafter, the temporary fired body was taken out from the yttrium-containing solution, and dried (1000° C. 30 minutes) after removing water under an ordinary pressure environment to prepare Zirconia mill blank (D15).

[Preparation of Zirconia Mill Blank (D16)]

Zirconia powder containing 4.0 mol % of solid-solved yttrium oxide: 100 g and yttrium oxide: 1 g were mixed in a ball mill. The mixed zirconia powder was filled in a mold (φ100 mm), and press molding (surface pressure: 50 MPa) was performed to obtain a molded body. Further, the molded body was subjected to CIP molding (maximum load pressure: 200 MPa, load pressure after releasing: 0 MPa, holding period of maximum load pressure: 1 minute, the number of times of repeat: 10 times). Thereafter, calcination was performed in an electric furnace (1000° C. 30 minutes) to prepare Zirconia mill blank (D16).

[Preparation of Zirconia Mill Blank (D17)]

Zirconia zol containing 4.0 mol % of solid-solved yttrium oxide (primary particle diameter: 29 nm, manufactured by CIK NanoTek Corporation) was filled in a mold (φ100 mm), and the solvent was dried to obtain a molded body. Further, the molded body was subjected to CIP molding (maximum load pressure: 200 MPa, load pressure after releasing: 0 MPa, holding period of maximum load pressure: 1 minute, the number of times of repeat: 10 times). Thereafter, calcination was performed in an electric furnace (1000° C. 30 minutes) to prepare Zirconia mill blank (D17).

[Preparation of Zirconia Mill Blank (D18)]

Zirconia powder containing 5.5 mol % of solid-solved yttrium oxide (Zpex SMILE: manufactured by Tosoh Corporation) was filled in a mold (φ100 mm), and press molding (surface pressure: 50 MPa) was performed to obtain a molded body. Further, the molded body was subjected to CIP molding (maximum load pressure: 200 MPa, load pressure after releasing: 0 MPa, holding period of maximum load pressure: 1 minute, the number of times of repeat: 1 time). Thereafter, calcination was performed in an electric furnace (1000° C. 30 minutes) to prepare Zirconia mill blank (D18).

[Preparation of Zirconia Mill Blank (D19)]

Zirconia powder containing 3.0 mol % of solid-solved yttrium oxide (Zpex: manufactured by Tosoh Corporation) was filled in a mold (φ100 mm), and press molding (surface pressure: 50 MPa) was performed to obtain a molded body. Further, the molded body was subjected to CIP molding (maximum load pressure: 200 MPa, load pressure after releasing: 0 MPa, holding period of maximum load pressure: 1 minute, the number of times of repeat: 1 time). Thereafter, calcination was performed in an electric furnace (1000° ° C. 30 minutes) to prepare Zirconia mill blank (D19).

[Preparation of Zirconia Mill Blank (D20)]

Zirconia powder containing 6.0 mol % of solid-solved yttrium oxide was filled in a mold (φ100 mm), and press molding (surface pressure: 50 MPa) was performed to obtain a molded body. Further, the molded body was subjected to CIP molding (maximum load pressure: 200 MPa, load pressure after releasing: 0 MPa, holding period of maximum load pressure: 1 minute, the number of times of repeat: 1 time). Thereafter, calcination was performed in an electric furnace (1000° C. 30 minutes) to prepare Zirconia mill blank (D20).

[Preparation of Zirconia Mill Blank (D21)]

Zirconia powder containing 2.0 mol % of solid-solved yttrium oxide was filled in a mold (φ100 mm), and press molding (surface pressure: 50 MPa) was performed to obtain a molded body. Further, the molded body was subjected to CIP molding (maximum load pressure: 200 MPa, load pressure after releasing: 0 MPa, holding period of maximum load pressure: 1 minute, the number of times of repeat: 1 time). Thereafter, calcination was performed in an electric furnace (1000° C. 30 minutes) to prepare a temporary fired body. The temporary fired body was immersed in the yttrium-containing solution (Y7) in an ordinary pressure atmosphere for 12 hours. Thereafter, the temporary fired body was taken out from the yttrium-containing solution, and dried (100° ° C. 30 minutes) after removing water under an ordinary pressure environment to prepare Zirconia mill blank (D21).

[Preparation of Zirconia Mill Blank (D22)]

Zirconia powder containing 4.0 mol % of solid-solved yttrium oxide: 100 g and yttrium oxide: 1 g were mixed in a ball mill. The mixed zirconia powder was filled in a mold (φ100 mm), and press molding (surface pressure: 50 MPa) was performed to obtain a molded body. Further, the molded body was subjected to CIP molding (maximum load pressure: 200 MPa, load pressure after releasing: 0 MPa, holding period of maximum load pressure: 1 minute, the number of times of repeat: 1 time). Thereafter, calcination was performed in an electric furnace (1000° C., 30 minutes) to prepare Zirconia mill blank (D22).

[Preparation of Zirconia Mill Blank (D23)]

Zirconia powder containing 5.5 mol % of solid-solved yttrium oxide (Zpex SMILE: manufactured by Tosoh Corporation) was filled in a mold (φ100 mm), and press molding (surface pressure: 50 MPa) was performed to obtain a molded body. Further, the molded body was subjected to CIP molding (maximum load pressure: 200 MPa, load pressure after releasing: 0 MPa, holding period of maximum load pressure: 1 minute, the number of times of repeat: 1 time). Thereafter, calcination was performed in an electric furnace (1300° ° C. 30 minutes) to prepare a temporary fired body. The temporary fired body was immersed in the yttrium containing solution (Y1) in an ordinary pressure atmosphere for 12 hours. Thereafter, the temporary fired body was taken out from the yttrium-containing solution, and dried (120° ° C. 30 minutes) after removing water under an ordinary pressure environment to prepare Zirconia mill blank (D23).

Characteristics evaluation method of Zirconia mill blanks D1 to D23 are described below.

[Evaluation of Yttrium Amount Contained in Test Specimen]

The test specimen for evaluating the yttrium amount was prepared by cutting and machining each zirconia mill blank into a round plate shape (φ14 mm×1.6 mm). A molar fraction of yttrium in terms of oxide (yttrium oxide) contained in each test specimen was measured by using a fluorescent X-ray apparatus (manufactured by Rigaku Corporation). In addition, yttrium amount obtained by this this test was defined as the total amount of yttrium solid-solved in zirconia and the yttrium not solid-solved in zirconia.

[Calculation Method of Yttrium Amount in Zirconia Particle Containing Solid-Solved Yttrium (a1) and Yttrium Amount in Yttrium Compound not Solid-Solved in Zirconia (a2)]

The yttrium amount in the (a1) zirconia particle containing solid-solved yttrium and the (a2) yttrium compound not solid-solved in zirconia was calculated by acid extraction process. Because the yttrium in the zirconia particle containing solid-solved yttrium in the present disclosure is not decomposed or dissolved by acid, the molar fraction of the yttrium oxide based on the zirconia does not change. On the other hand, because the yttrium compound in the (a2) yttrium compound not solid-solved in zirconia in the present disclosure is decomposed or dissolved by acid, the molar fraction of yttrium oxide based on the zirconia changes. Therefore, in the present disclosure, yttrium which is decomposed or dissolved by acid is calculated as yttrium not solid-solved in zirconia.

[Measurement and Calculation of Yttrium Amount in Zirconia Particle Containing Solid-Solved Yttrium (a1) and Yttrium Compound not Solid-Solved in Zirconia (a2)]

The test specimen for evaluating yttrium amount (φ14 mm×1.6 mm) was immersed in nitric acid (15 vol. %) for 48 hours to dissolve yttrium not solid-solved. After dissolving, a molar fraction of yttrium in terms of oxide (yttrium oxide) contained in each test specimen was measured by using a fluorescent X-ray apparatus (manufactured by Rigaku Corporation). In addition, in the present disclosure, an amount of yttrium oxide obtained after dissolving is defined as the amount of yttrium solid-solved in zirconia. In addition, the amount of yttrium not solid-solved in zirconia is calculated by subtracting the amount of yttrium solid-solved in zirconia from the total amount of the yttrium calculated in the evaluation of yttrium.

[Evaluation of Specific Surface Area]

The test specimen for evaluating specific surface area was prepared by cutting and machining each zirconia mill blank into a prismatic column (5 mm×5 mm×5 mm). Specific surface area of each test specimen was measured by using an automatic specific surface area/micropore distribution measuring device (manufactured by Quantachrome Instruments.). In addition, specific surface area was calculated by the multi-point method (P/P0=0.10 to 0.30) from data at desorption.

[Evaluation of Skeleton Volume]

The test specimen for evaluating the skeleton volume was prepared by cutting and machining the zirconia mill blank into a prismatic column (5 mm×5 mm×5 mm). The true density of each test specimen was measured by using a dry-process pycnometer (AccuPycII 1340, manufactured by Shimadzu Corporation). In the present disclosure, the skeleton volume is calculated by the following formula (2) from the obtained true density.

$$\text{Skelton volume (cm}^3\text{/g)}=1/\text{true density (g/cm}^3\text{)} \quad (2)$$

[Evaluation of Pore Volume and Pore Diameter]

The test specimen for evaluating the pore volume was prepared by cutting and machining the zirconia mill blank into a prismatic column (5 mm×5 mm×5 mm). The pore volume of each test specimen was measured by using a full automatic multifunctional mercury porosimeter (POREMASTER, manufactured by Quantachrome Instruments.) In addition, the measurement condition is as follows: mercury surface tension: 480 erg/cm$^2$, contact angle: 140°, discharge contact angle: 140°, pressure: 0 to 50000 psia.

[Evaluation of Porosity]

The porosity of the present disclosure was calculated by the following formula (3).

$$\text{Porosity (\%)}=\text{pore volume}/(\text{pore volume}+\text{skeleton volume})\times 100 \quad (3)$$

[Evaluation of Three-Point Bending Strength]

The three-point bending test specimen was prepared by cutting and machining the zirconia mill blank into a plate shape (width: 4.0 mm×length: 20 mm×thickness: 1.2 mm). The bending test was performed in accordance with ISO6872 (span distance: 12 mm, crosshead speed: 1.0 mm/min).

[Evaluation of Vickers Hardness]

The test specimen for evaluating Vickers hardness was prepared by cutting and machining each zirconia mill blank into a round plate shape (φ14 mm×1.6 mm). The Vickers hardness test was performed in accordance with JISZ2244 (Vickers hardness test—Test method).

[Evaluation of Machinability]

Machinability was evaluated by using a molar tooth crown model (minimum thickness: 0.05 mm). The test specimen was prepared by cutting and machining each zirconia mill blank. Machinability was evaluated by confirming the presence or absence of chipping by visual observation. The rating criteria were as follow:

A: no chipping was observed (excellent);

B: chipping was slightly observed but there was no problem in clinical practice (good);

C: chipping was observed and there is a possibility of a problem in clinical practice (bad).

Characteristics evaluation method of zirconia perfect sintered body prepared from the Zirconia mill blanks D1 to D23 are described below.

[Evaluation of Three-Point Bending Strength]

The three-point bending test specimen was prepared by cutting and machining the zirconia mill blank for dental cutting and machining into a plate shape (width: 4.8 mm×length: 20 mm×thickness: 1.6 mm). Each test specimen was perfect sintered (firing temperature: 1450 to 1600° C. temperature increase rate: 5° C./minute, holding period: 2 hours) in a firing furnace. Thereafter, the size of each test specimen (width: 4.0 mm×length: 16 mm×thickness: 1.2 mm) was adjusted with a surface grinder. The bending test was performed in accordance with ISO6872 (span distance: 12 mm, crosshead speed: 1.0 mm/min).

[Evaluation of Translucency]

The test specimen for evaluating the translucency was prepared by cutting and machining the zirconia mill blank for dental cutting and machining into a round plate shape (φ14 mm×1.6 mm). Each test specimen was perfect sintered (firing temperature: 1450 to 1600° C., temperature increase rate: 5° C./minute, holding period: 2 hours) in a firing furnace. Then, the thickness (1.0 mm) of each test specimen was adjusted with a surface grinder. The translucency was evaluated by measuring the contrast ratio. The contrast ratio was measured by using a spectrocolorimeter (manufactured by Konica Minolta). In the following formula, Yw is the value Y measured by placing the white plate under the test specimen, and Yb is the value Y measured by placing the black plate under the test specimen. The contrast ratio was calculated from the following formula (4).

$$\text{The contrast ratio}=Yb/Yw \tag{4}$$

When the contrast ratio value is close to zero, the materials are transparency. When the contrast ratio value is close to 1, the materials are opaqueness.

Tables 3 to 7 show the characteristic test results of the zirconia mill blanks for dental cutting and machining D1 to D23.

TABLE 3

| | | Example 1 | Example 2 | Example 3 | Example 4 | Example 5 |
|---|---|---|---|---|---|---|
| Zirconia mill blank for dental cutting and machining | Zirconia mill blank | D1 | D2 | D3 | D4 | D5 |
| | Yttrium amount (a1) in zirconia particle containing solid-solved yttrium (mol %) | 5.5 | 5.5 | 5.5 | 5.5 | 3.0 |
| | Yttrium amount (a2) in yttrium compound not solid-solved in zirconia (mol %) | 0.5 | 0.5 | 0.8 | 0.5 | 2.8 |
| | CIP treatment times | 10 | 10 | 10 | 10 | 10 |
| | CIP treatment times after degreasing | — | — | — | — | — |
| | Maximum load pressure in CIP treatment (Mpa) | 200 | 200 | 200 | 200 | 200 |
| | Pressure after releasing in CIP treatment (Mpa) | 0 | 0 | 0 | 0 | 0 |
| | Holding period of maximum load pressure in CIP treatment (minute) | 1 | 0 | 0 | 3 | 1 |
| | Specific surface area ($m^2/g$) | 7.4 | 1.4 | 6.4 | 9.5 | 7.9 |
| | Skeleton volume ($cm^3/g$) | 0.166 | 0.163 | 0.165 | 0.165 | 0.164 |
| | Pore volume ($cm^3/g$) | 0.0566 | 0.0294 | 0.0566 | 0.0697 | 0.069 |
| | Pore diameter (nm) | 150 | 72 | 151 | 195 | 55 |
| | Porosity (%) | 25.5 | 15.3 | 25.6 | 29.7 | 29.6 |
| | Bending strength (MPa) | 35 | 97 | 37 | 25 | 33 |
| | Vickers hardness (Hv0.2) | 65 | 149 | 65 | 50 | 70 |
| | Machinability | A | A | A | A | A |
| Perfect sintered body | Firing period (minute) | 410 | 410 | 410 | 410 | 410 |
| | Holding period (minute) | 120 | 120 | 120 | 120 | 120 |
| | Sintering temperature (° C.) | 1600 | 1600 | 1600 | 1600 | 1550 |
| | Bending strength (MPa) | 555 | 510 | 558 | 523 | 639 |
| | Contrast ratio | 0.59 | 0.65 | 0.6 | 0.67 | 0.69 |

TABLE 4

| | | Example 6 | Example 7 | Example 8 | Example 9 | Example 10 |
|---|---|---|---|---|---|---|
| Zirconia mill blank for dental cutting and machining | Zirconia mill blank | D6 | D7 | D1 | D1 | D8 |
| | Yttrium amount (a1) in zirconia particle containing solid-solved yttrium (mol %) | 6.5 | 5.5 | 5.5 | 5.5 | 5.5 |
| | Yttrium amount (a2) in yttrium compound not solid-solved in zirconia (mol %) | 0.1 | 0.5 | 0.5 | 0.3 | 0.3 |
| | CIP treatment times | 10 | 2 | 10 | 10 | 30 |
| | CIP treatment times after degreasing | — | — | — | — | — |
| | Maximum load pressure in CIP treatment (Mpa) | 200 | 200 | 200 | 200 | 200 |
| | Pressure after releasing in CIP treatment (Mpa) | 0 | 0 | 0 | 0 | 0 |
| | Holding period of maximum load pressure in CIP treatment (minute) | 0 | 1 | 1 | 1 | 1 |
| | Specific surface area ($m^2/g$) | 8.8 | 7.4 | 7.4 | 7.4 | 8.2 |
| | Skeleton volume ($cm^3/g$) | 0.165 | 0.165 | 0.165 | 0.166 | 0.166 |
| | Pore volume ($cm^3/g$) | 0.064 | 0.0566 | 0.0566 | 0.07 | 0.041 |
| | Pore diameter (nm) | 164 | 150 | 150 | 148 | 131 |
| | Porosity (%) | 27.9 | 25.6 | 25.6 | 29.7 | 19.8 |
| | Bending strength (MPa) | 31 | 37 | 32 | 25 | 41 |
| | Vickers hardness (Hv0.2) | 63 | 55 | 68 | 54 | 77 |
| | Machinability | A | A | A | A | A |

TABLE 4-continued

| | | Example 6 | Example 7 | Example 8 | Example 9 | Example 10 |
|---|---|---|---|---|---|---|
| Perfect sintered body | Firing period (minute) | 410 | 410 | 410 | 410 | 410 |
| | Holding period (minute) | 120 | 120 | 120 | 120 | 120 |
| | Sintering temperature (° C.) | 1550 | 1450 | 1550 | 1450 | 1600 |
| | Bending strength (MPa) | 503 | 752 | 639 | 849 | 585 |
| | Contrast ratio | 0.68 | 0.68 | 0.65 | 0.68 | 0.58 |

TABLE 5

| | | Example 11 | Example 12 | Example 13 | Example 14 | Example 15 |
|---|---|---|---|---|---|---|
| Zirconia mill blank for dental cutting and machining | Zirconia mill blank | D9 | D10 | D11 | D12 | D13 |
| | Yttrium amount (a1) in zirconia particle containing solid-solved yttrium (mol %) | 5.5 | 5.5 | 5.5 | 4.0 | 4.0 |
| | Yttrium amount (a2) in yttrium compound not solid-solved in zirconia (mol %) | 0.3 | 0.5 | 0.5 | 1.5 | 2.0 |
| | CIP treatment times | 30 | 10 | 10 | 10 | 10 |
| | CIP treatment times after degreasing | — | — | — | — | — |
| | Maximum load pressure in CIP treatment (Mpa) | 50 | 200 | 200 | 200 | 200 |
| | Pressure after releasing in CIP treatment (Mpa) | 0 | 0 | 0 | 0 | 0 |
| | Holding period of maximum load pressure in CIP treatment (minute) | 1 | 1 | 1 | 1 | 1 |
| | Specific surface area ($m^2$/g) | 9.1 | 7.1 | 6.5 | 8.8 | 8.8 |
| | Skeleton volume ($cm^3$/g) | 0.166 | 0.165 | 0.165 | 0.165 | 0.165 |
| | Pore volume ($cm^3$/g) | 0.068 | 0.0569 | 0.0561 | 0.0569 | 0.0569 |
| | Pore diameter (nm) | 119 | 150 | 150 | 130 | 134 |
| | Porosity (%) | 29.1 | 25.7 | 25.4 | 25.7 | 25.7 |
| | Bending strength (MPa) | 44 | 35 | 34 | 33 | 33 |
| | Vickers hardness (Hv0.2) | 67 | 53 | 57 | 51 | 53 |
| | Machinability | A | A | A | A | A |
| Perfect sintered body | Firing period (minute) | 410 | 410 | 410 | 410 | 410 |
| | Holding period (minute) | 120 | 120 | 120 | 120 | 120 |
| | Sintering temperature (° C.) | 1500 | 1600 | 1600 | 1600 | 1600 |
| | Bending strength (MPa) | 671 | 558 | 558 | 858 | 658 |
| | Contrast ratio | 0.66 | 0.69 | 0.66 | 0.69 | 0.64 |

TABLE 6

| | | Example 16 | Example 17 | Example 18 | Example 19 | Comparative Example 1 |
|---|---|---|---|---|---|---|
| Zirconia mill blank for dental cutting and machining | Zirconia mill blank | D14 | D15 | D16 | D17 | D18 |
| | Yttrium amount (a1) in zirconia particle containing solid-solved yttrium (mol %) | 5.5 | 2.0 | 4.0 | 5.5 | 5.5 |
| | Yttrium amount (a2) in yttrium compound not solid-solved in zirconia (mol %) | — | 3.5 | 1.0 | — | — |
| | CIP treatment times | 10 | 10 | 10 | 10 | 1 |
| | CIP treatment times after degreasing | — | — | — | — | — |
| | Maximum load pressure in CIP treatment (Mpa) | 200 | 200 | 200 | 200 | 200 |
| | Pressure after releasing in CIP treatment (Mpa) | 0 | 0 | 0 | 0 | 0 |
| | Holding period of maximum load pressure in CIP treatment (minute) | 1 | 0 | 1 | 1 | 1 |
| | Specific surface area ($m^2$/g) | 6.5 | 6.1 | 6.1 | 6.5 | 6.5 |
| | Skeleton volume ($cm^3$/g) | 0.165 | 0.171 | 0.171 | 0.165 | 0.165 |
| | Pore volume ($cm^3$/g) | 0.0666 | 0.0569 | 0.0556 | 0.071 | 0.0711 |
| | Pore diameter (nm) | 47 | 50 | 110 | 49 | 81 |
| | Porosity (%) | 28.7 | 25.0 | 24.6 | 30.0 | 30.1 |
| | Bending strength (MPa) | 27 | 26 | 47 | 29 | 27 |

TABLE 6-continued

| | | Example 16 | Example 17 | Example 18 | Example 19 | Comparative Example 1 |
|---|---|---|---|---|---|---|
| | Vickers hardness (Hv0.2) | 47 | 50 | 67 | 49 | 47 |
| | Machinability | B | A | A | B | C |
| Perfect sintered body | Firing period (minute) | 410 | 410 | 410 | 410 | 410 |
| | Holding period (minute) | 120 | 120 | 120 | 120 | 120 |
| | Sintering temperature (° C.) | 1450 | 1600 | 1550 | 1550 | 1600 |
| | Bending strength (MPa) | 826 | 897 | 809 | 644 | 806 |
| | Contrast ratio | 0.68 | 0.70 | 0.70 | 0.70 | 0.71 |

TABLE 7

| | | Comparative Example 2 | Comparative Example 3 | Comparative Example 4 | Comparative Example 5 | Comparative Example 6 |
|---|---|---|---|---|---|---|
| Zirconia mill blank for dental cutting and machining | Zirconia mill blank | D19 | D20 | D21 | D22 | D23 |
| | Yttrium amount (a1) in zirconia particle containing solid-solved yttrium (mol %) | 3.0 | 6.0 | 2.0 | 4.0 | 5.5 |
| | Yttrium amount (a2) in yttrium compound not solid-solved in zirconia (mol %) | — | — | 3.5 | 1.0 | 0.5 |
| | CIP treatment times | 1 | 1 | 1 | 1 | 1 |
| | CIP treatment times after degreasing | — | — | — | — | — |
| | Maximum load pressure in CIP treatment (Mpa) | 200 | 200 | 200 | 200 | 200 |
| | Pressure after releasing in CIP treatment (Mpa) | 0 | 0 | 0 | 0 | 0 |
| | Holding period of maximum load pressure in CIP treatment (minute) | 1 | 1 | 1 | 1 | 1 |
| | Specific surface area ($m^2/g$) | 9.3 | 6.1 | 6.1 | 6.1 | 0.8 |
| | Skeleton volume ($cm^3/g$) | 0.161 | 0.168 | 0.171 | 0.171 | 0.165 |
| | Pore volume ($cm^3/g$) | 0.079 | 0.0769 | 0.03 | 0.0803 | 0.028 |
| | Pore diameter (nm) | 55 | 206 | 140 | 147 | 35 |
| | Porosity (%) | 32.9 | 31.3 | 14.9 | 32.0 | 14.5 |
| | Bending strength (MPa) | 29 | 28 | 26 | 47 | 110 |
| | Vickers hardness (Hv0.2) | 48 | 49 | 50 | 110 | 240 |
| | Machinability | C | C | C | C | C |
| Perfect sintered body | Firing period (minute) | 410 | 410 | 410 | 410 | 410 |
| | Holding period (minute) | 120 | 120 | 120 | 120 | 120 |
| | Sintering temperature (° C.) | 1600 | 1600 | 1550 | 1550 | 1450 |
| | Bending strength (MPa) | 1396 | 368 | 979 | 809 | 806 |
| | Contrast ratio | 0.76 | 0.71 | 0.82 | 0.82 | 0.75 |

Examples 1 to 15

It was confirmed in Examples 1 to 15 that the porosity of the zirconia mill blank for dental cutting and machining was within a range of 15 to 30%. Further, it was confirmed in the zirconia mill blanks for dental cutting and machining that the (a2) yttrium compound not solid-solved in zirconia was dispersed on a surface of the (a1) zirconia particle containing solid-solved yttrium. With respect to the machinability of the zirconia mill blank for dental cutting and machining, it was confirmed that the number of chippings or breakages was smaller than those in the conventional zirconia mill blank for dental cutting and machining and therefore the machinability was excellent. Furthermore, it was confirmed in Examples 1 to 15 that the zirconia perfect sintered body prepared from the zirconia mill blank for dental cutting and machining had superior bending strength more than 500 MPa, and very high translucency of a contrast ratio less than 0.70 regarding the translucency.

Example 16

It was confirmed in Example 16 that the porosity of the zirconia mill blank for dental cutting and machining was within a range of 15 to 30%. With respect to the machinability of the zirconia mill blank for dental cutting and machining, it was confirmed that the number of chippings or breakages was smaller than those in the conventional zirconia mill blank for dental cutting and machining. Furthermore, it was confirmed in Example 16 that the zirconia perfect sintered body prepared from the zirconia mill blank for dental cutting and machining had superior bending strength more than 500 MPa and superior translucency (contrast ratio).

Example 17

It was confirmed in Example 17 that the porosity of the zirconia mill blank for dental cutting and machining was within a range of 15 to 30%. Further, it was confirmed in the zirconia mill blanks for dental cutting and machining that the (a2) yttrium compound not solid-solved in zirconia was dispersed on a surface of the (a1) zirconia particle containing solid-solved yttrium. With respect to the machinability of the zirconia mill blank for dental cutting and machining, it was confirmed that the number of chippings or breakages was smaller than those in the conventional zirconia mill blank for dental cutting and machining and therefore the machinability was excellent. Furthermore, it was confirmed in Example 17 that the zirconia perfect sintered body prepared from the zirconia mill blank for dental cutting and machining had superior bending strength more than 500 MPa and superior translucency (contrast ratio).

Example 18

It was confirmed in Example 18 that the porosity of the zirconia mill blank for dental cutting and machining was within a range of 15 to 30%. Further, it was confirmed in the zirconia mill blanks for dental cutting and machining that the (a1) zirconia particle containing solid-solved yttrium and the (a2) yttrium compound not solid-solved in zirconia were contained. With respect to the machinability of the zirconia mill blank for dental cutting and machining, it was confirmed that the number of chippings or breakages was smaller than those in the conventional zirconia mill blank for dental cutting and machining and therefore the machinability was excellent. Furthermore, it was confirmed in Example 18 that the zirconia perfect sintered body prepared from the zirconia mill blank for dental cutting and machining had superior bending strength more than 500 MPa and superior translucency (contrast ratio).

Example 19

It was confirmed in Example 19 that the porosity of the zirconia mill blank for dental cutting and machining was within a range of 15 to 30%. With respect to the machinability of the zirconia mill blank for dental cutting and machining, it was confirmed that the number of chippings or breakages was smaller than those in the conventional zirconia mill blank for dental cutting and machining. Furthermore, it was confirmed in Example 19 that the zirconia perfect sintered body prepared from the zirconia mill blank for dental cutting and machining had superior bending strength more than 500 MPa and superior translucency (contrast ratio).

Comparative Example 1

In the Comparative Example 1, the zirconia mill blank for dental cutting and machining contained 5.5 mol % of yttrium which was solid-solved. In the zirconia mill blank for dental cutting and machining, the translucency (contrast ratio) after perfect sintering was less than 0.80 and therefore it could be used in clinical practice without problem. However, because the porosity exceeded 30%, chipping resistance in cutting and machining were bad.

Comparative Example 2

In the Comparative Example 2, the zirconia mill blank for dental cutting and machining contained 3.0 mol % of yttrium which was solid-solved. In the zirconia mill blank for dental cutting and machining, the translucency (contrast ratio) after perfect sintering was less than 0.80 and therefore it couuld be used in clinical practice without problem. However, because the porosity exceeded 30%, chipping resistance in cutting and machining were bad.

Comparative Example 3

In the Comparative Example 3, the zirconia mill blank for dental cutting and machining contained 6.0 mol % of yttrium which was solid-solved. In the zirconia mill blank for dental cutting and machining, the translucency (contrast ratio) after perfect sintering was less than 0.80 and therefore it could be used in clinical practice without problem. However, because the porosity exceeded 30%, chipping resistance in cutting and machining were bad.

Comparative Example 4

In the Comparative Example 4, the zirconia mill blank for dental cutting and machining contained 2.0 mol % of yttrium which was solid-solved and 3.5 mol % of yttrium which was not solid-solved. Because the porosity in the zirconia mill blank for dental cutting and machining was less than 15%, chipping resistance in cutting and machining were bad. Further, it was confirmed that the bending strength was not sufficient, the contrast ratio was 0.80 or more, and the translucency was insufficient in comparison with Examples 1 to 15 in visual observation.

Comparative Example 5

In the Comparative Example 5, the zirconia mill blank for dental cutting and machining contained 4.0 mol % of yttrium which was solid-solved and 1.0 mol % of yttrium which was not solid-solved. In the zirconia mill blank for dental cutting and machining, the porosity exceeded 30% and the (a2) yttrium compound not solid-solved in zirconia was not dispersed on a surface of the zirconia particle containing solid-solved yttrium (a1). Therefore, chipping resistance in cutting and machining were bad. Further, it was confirmed that the contrast ratio was 0.80 or more, and the translucency was insufficient in comparison with Examples 1 to 15 in visual observation.

Comparative Example 6

In the Comparative Example 6, the zirconia mill blank for dental cutting and machining contained 5.5 mol % of yttrium which was solid-solved and 0.5 mol % of yttrium which was not solid-solved. Because the porosity in the zirconia mill blank for dental cutting and machining was less than 15%, the translucency (contrast ratio) after perfect sintering was less than 0.80 and therefore although it could be used in clinical practice without problem, chipping resistance in cutting and machining were bad.

Examples 20 to 30. Comparative Examples 7 to 12. And Reference Examples 1 to 2

[Preparation of Zirconia Mill Blank (D24)]

Zirconia powder containing 4.0 mol % of solid-solved yttrium oxide (Zpex4: manufactured by Tosoh Corporation) was filled in a mold (φ100 mm), and press molding (surface pressure: 50 MPa) was performed to obtain a molded body. Further, the molded body was subjected to CIP molding (maximum load pressure: 200 MPa, load pressure after releasing: 0 MPa, holding period of maximum load pressure: 1 minute, the number of times of repeat: 10 times). Thereafter, calcination was performed in an electric furnace (1000° C. 30 minutes) to prepare Zirconia mill blank (D24).

[Preparation of Zirconia Mill Blank (D25)]

Zirconia mill blank (D25) was prepared and evaluated in the same manner as in the Zirconia mill blank (D24) except that the number of times of repeat of CIP treatment was five times.

[Preparation of Zirconia Mill Blank (D26)]

Zirconia mill blank (D26) was prepared and evaluated in the same manner as in the Zirconia mill blank (D24) except that the number of times of repeat of CIP treatment was twenty times.

[Preparation of Zirconia Mill Blank (D27)]

Zirconia powder containing 4.0 mol % of solid-solved yttrium oxide (Zpex4: manufactured by Tosoh Corporation) was filled in a mold (φ100 mm), and press molding (surface pressure: 50 MPa) was performed to obtain a molded body. Further, the molded body was subjected to CIP molding (maximum load pressure: 200 MPa, load pressure after releasing: 0 MPa, holding period of maximum load pressure: 1 minute, the number of times of repeat: 10 times). Thereafter, degreasing was performed in an electric furnace (500° C. 30 minutes). The degreased molded body was further subjected to CIP treatment (maximum load pressure: 200 MPa, load pressure after releasing: 0 MPa, holding period of maximum load pressure: 1 minute, the number of times of repeat: 10 times). Thereafter, calcination was performed in an electric furnace (1000° C. 30 minutes) to prepare a zirconia mill blank. This zirconia mill blank was evaluated in the same manner as in the Zirconia mill blank (D24) other than those.

[Preparation of Zirconia Mill Blank (D28)]

A zirconia mill blank was prepared and evaluated in the same manner as in the Zirconia mill blank (D24) except that zirconia powder containing 5.5 mol % of solid-solved yttrium oxide (Zpex SMILE: manufactured by Tosoh Corporation) was used.

[Preparation of Zirconia Mill Blank (D29)]

A zirconia mill blank was prepared and evaluated in the same manner as in the Zirconia mill blank (D27) except that zirconia powder containing 5.5 mol % of solid-solved yttrium oxide (Zpex SMILE: manufactured by Tosoh Corporation) was used.

[Preparation of Zirconia Mill Blank (D30)]

A zirconia mill blank was prepared and evaluated in the same manner as in the Zirconia mill blank (D24) except that the maximum load pressure in CIP treatment was 180 MPa.

[Preparation of Zirconia Mill Blank (D31)]

A zirconia mill blank was prepared and evaluated in the same manner as in the Zirconia mill blank (D24) except that the load pressure after releasing in repetitive CIP treatment was 50 MPa.

[Preparation of Zirconia Mill Blank (D32)]

A zirconia mill blank was prepared and evaluated in the same manner as in the Zirconia mill blank (D24) except that the load pressure after releasing in repetitive CIP treatment was 100 MPa.

[Preparation of Zirconia Mill Blank (D33)]

A zirconia mill blank was prepared and evaluated in the same manner as in the Zirconia mill blank (D24) except that the holding period in CIP treatment was 0 second.

[Preparation of Zirconia Mill Blank (D34)]

A zirconia mill blank was prepared and evaluated in the same manner as in the Zirconia mill blank (D24) except that the holding period in CIP treatment was 3 minutes.

[Preparation of Zirconia Mill Blank (D35)]

A zirconia mill blank was prepared and evaluated in the same manner as in the Zirconia mill blank (D24) except that the number of times of repeat was one time.

[Preparation of Zirconia Mill Blank (D36)]

A zirconia mill blank was prepared and evaluated in the same manner as in the Zirconia mill blank (D28) except that the number of times of repeat was one time.

[Preparation of Zirconia Mill Blank (D37)]

A zirconia mill blank was prepared and evaluated in the same manner as in the Zirconia mill blank (D36) except that the normal sintering (firing temperature: 1450° C., temperature increase rate: 5° C./minute, holding period: 2 hours) was performed as the perfect sintering.

[Preparation of Zirconia Mill Blank (D38)]

A zirconia mill blank was prepared and evaluated in the same manner as in the Zirconia mill blank (D35) except that the holding period in CIP treatment was 10 minutes.

[Preparation of Zirconia Mill Blank (D39)]

A zirconia mill blank was prepared and evaluated in the same manner as in the Zirconia mill blank (D24) except that zirconia powder containing 2.5 mol % of solid-solved yttrium oxide was used as a base powder.

[Preparation of Zirconia Mill Blank (D40)]

A zirconia mill blank was prepared and evaluated in the same manner as in the Zirconia mill blank (D39) except that the normal sintering (firing temperature: 1450° C., temperature increase rate: 5° C./minute, holding period: 2 hours) was performed as the perfect sintering.

[Preparation of Zirconia Mill Blank (D41)]

A zirconia mill blank was prepared and evaluated in the same manner as in the Zirconia mill blank (D24) except that zirconia powder containing 7.0 mol % of solid-solved yttrium oxide was used as a base powder.

[Preparation of Zirconia Mill Blank (D42)]

A zirconia mill blank was prepared and evaluated in the same manner as in the Zirconia mill blank (D41) except that the normal sintering (firing temperature: 1450° C., temperature increase rate: 5° C./minute, holding period: 2 hours) was performed as the perfect sintering.

[Preparation of Zirconia Mill Blank (D43)]

A zirconia mill blank was prepared and evaluated in the same manner as in the Zirconia mill blank (D35) except that the maximum load pressure in CIP treatment was 40 MPa.

[Preparation of Zirconia Mill Blank (D44)]

A zirconia mill blank was prepared and evaluated in the same manner as in the Zirconia mill blank (D35) except that the calcination temperature was 1300° C.

Evaluation of specific surface area, evaluation of skeleton volume, evaluation of pore volume, evaluation of porosity, evaluation of three-point bending strength and evaluation of Vickers hardness of the Zirconia mill blanks D24 to D44 were evaluated in the same manner as in the Zirconia mill blanks D1 to D23.

Characteristics evaluation method of zirconia perfect sintered body prepared from the Zirconia mill blanks D24 to D44 are described below.

[Evaluation of Three-Point Bending Strength]

The three-point bending test specimen was prepared by cutting and machining the zirconia mill blank into a plate shape (width: 4.8 mm×length: 20 mm×thickness: 1.6 mm). Each test specimen was sintered by sintering for a short period (firing temperature: 1600° C. temperature increase rate: 70° C./minute, holding period: 2 minutes) in a firing furnace. In addition, the test specimens of the Zirconia mill blank D38. D41 and D42 were also perfect sintered by normal sintering (firing temperature: 1450 to 1600° C. temperature increase rate: 5° C./minute, holding period: 2 hours) in a firing furnace. Thereafter, the size of each test specimen (width: 4.0 mm×length: 16 mm×thickness: 1.2 mm) was adjusted with a surface grinder. The bending test was performed in accordance with ISO6872 (span distance: 12 mm, crosshead speed: 1.0 mm/min).

[Evaluation of Translucency]

The test specimen for evaluating the translucency was prepared by cutting and machining the zirconia mill blank for dental cutting and machining into a round plate shape (φ14 mm×1.6 mm). Each test specimen was sintered by sintering for a short period (firing temperature: 1600° C. temperature increase rate: 70° C./minute, holding period: 2 minutes) in a firing furnace. In addition, the test specimens of the Zirconia mill blank D38. D41 and D42 were also perfect sintered by normal sintering (firing temperature: 1450 to 1600° C. temperature increase rate: 5° C./minutes, holding time: 2 hours) in a firing furnace. Then, the thickness (1.0 mm) of each test body was adjusted with a surface grinder. The translucency was evaluated by measuring the contrast ratio. The contrast ratio was measured by using a spectrocolorimeter (manufactured by Konica Minolta). In the following formula. Yw is the value Y measured by placing the white plate under the test specimen, and Yb is the value Y measured by placing the black plate under the test specimen. The contrast ratio was calculated from the following formula (5).

$$\text{The contrast ratio}=Yb/Yw \tag{5}$$

When the contrast ratio value is close to zero, the materials are transparency. When the contrast ratio value is close to 1, the materials are opaqueness.

TABLE 8

| | | Example 20 | Example 21 | Example 22 | Example 23 | Example 24 |
|---|---|---|---|---|---|---|
| Zirconia mill blank for dental cutting and machining | Zirconia mill blank | D24 | D25 | D26 | D27 | D28 |
| | Yttrium amount (a1) in zirconia particle containing solid-solved yttrium (mol %) | 4.0 | 4.0 | 4.0 | 4.0 | 5.5 |
| | CIP treatment times | 10 | 5 | 20 | 10 | 10 |
| | CIP treatment times after degreasing | 0 | 0 | 0 | 10 | 0 |
| | Maximum load pressure in CIP treatment (Mpa) | 200 | 200 | 200 | 200 | 200 |
| | Pressure after releasing in CIP treatment (Mpa) | 0 | 0 | 0 | 0 | 0 |
| | Holding period of maximum load pressure in CIP treatment (minute) | 1 | 1 | 1 | 1 | 1 |
| | Specific surface area ($m^2/g$) | 6.5 | 5.7 | 5.4 | 6.2 | 7.1 |
| | Skeleton volume ($cm^3/g$) | 0.163 | 0.168 | 0.165 | 0.167 | 0.164 |
| | Pore volume ($cm^3/g$) | 0.0541 | 0.0598 | 0.0532 | 0.0527 | 0.0552 |
| | Pore diameter (nm) | 82 | 105 | 131 | 76 | 150 |
| | Porosity (%) | 24.9 | 26.3 | 24.4 | 24.0 | 25.2 |
| | Bending strength (MPa) | 37 | 30 | 44 | 46 | 33 |
| | Vickers hardness (Hv0.2) | 64 | 58 | 71 | 75 | 63 |
| | Machinability | A | A | A | A | A |
| Perfect sintered body | Firing period (minute) | 25 | 25 | 25 | 25 | 25 |
| | Holding period (minute) | 2 | 2 | 2 | 2 | 2 |
| | Sintering temperature (° C.) | 1600 | 1600 | 1600 | 1600 | 1600 |
| | Bending strength (MPa) | 1254 | 1223 | 1260 | 1247 | 655 |
| | Contrast ratio | 0.69 | 0.7 | 0.68 | 0.68 | 0.69 |

TABLE 9

| | | Example 25 | Example 26 | Example 27 | Example 28 | Example 29 |
|---|---|---|---|---|---|---|
| Zirconia mill blank for dental cutting and machining | Zirconia mill blank | D29 | D30 | D31 | D32 | D33 |
| | Yttrium amount (a1) in zirconia particle containing solid-solved yttrium (mol %) | 5.5 | 4.0 | 4.0 | 4.0 | 4.0 |
| | CIP treatment times | 10 | 10 | 10 | 10 | 10 |
| | CIP treatment times after degreasing | 10 | 0 | 0 | 0 | 0 |
| | Maximum load pressure in CIP treatment (Mpa) | 200 | 180 | 200 | 200 | 200 |
| | Pressure after releasing in CIP treatment (Mpa) | 0 | 0 | 50 | 100 | 0 |
| | Holding period of maximum load pressure in CIP treatment (minute) | 1 | 1 | 1 | 1 | 0 |
| | Specific surface area ($m^2/g$) | 5.9 | 7.4 | 6.7 | 7.5 | 7.4 |
| | Skeleton volume ($cm^3/g$) | 0.162 | 0.165 | 0.164 | 0.162 | 0.167 |
| | Pore volume ($cm^3/g$) | 0.0523 | 0.0601 | 0.0565 | 0.0612 | 0.0553 |
| | Pore diameter (nm) | 145 | 69 | 171 | 116 | 94 |
| | Porosity (%) | 24.4 | 26.7 | 25.6 | 27.4 | 24.9 |
| | Bending strength (MPa) | 41 | 32 | 36 | 32 | 37 |
| | Vickers hardness (Hv0.2) | 70 | 60 | 67 | 61 | 62 |
| | Machinability | A | A | A | A | A |
| Perfect sintered body | Firing period (minute) | 25 | 25 | 25 | 25 | 25 |
| | Holding period (minute) | 2 | 2 | 2 | 2 | 2 |
| | Sintering temperature (° C.) | 1600 | 1600 | 1600 | 1600 | 1600 |
| | Bending strength (MPa) | 662 | 1270 | 1247 | 1264 | 1208 |
| | Contrast ratio | 0.68 | 0.7 | 0.69 | 0.7 | 0.69 |

TABLE 10

| | | Example 30 | Comparative Example 7 | Comparative Example 8 | Comparative Example 9 | Comparative Example 10 |
|---|---|---|---|---|---|---|
| Zirconia mill blank for dental cutting and machining | Zirconia mill blank | D34 | D35 | D36 | D37 | D38 |
| | Yttrium amount (a1) in zirconia particle containing solid-solved yttrium (mol %) | 4.0 | 4.0 | 5.5 | 5.5 | 4.0 |
| | CIP treatment times | 10 | 1 | 1 | 1 | 1 |
| | CIP treatment times after degreasing | 0 | 0 | 0 | 0 | 0 |
| | Maximum load pressure in CIP treatment (Mpa) | 200 | 200 | 200 | 200 | 200 |
| | Pressure after releasing in CIP treatment (Mpa) | 0 | 0 | 0 | 0 | 0 |
| | Holding period of maximum load pressure in CIP treatment (minute) | 3 | 1 | 1 | 1 | 10 |
| | Specific surface area ($m^2/g$) | 6.0 | 7.7 | 7.4 | 7.6 | 7.3 |
| | Skeleton volume ($cm^3/g$) | 0.165 | 0.161 | 0.162 | 0.161 | 0.163 |
| | Pore volume ($cm^3/g$) | 0.0548 | 0.0695 | 0.0701 | 0.0702 | 0.0708 |
| | Pore diameter (nm) | 101 | 161 | 156 | 127 | 143 |
| | Porosity (%) | 24.9 | 30.2 | 30.2 | 30.4 | 30.3 |
| | Bending strength (MPa) | 35 | 25 | 26 | 24 | 27 |
| | Vickers hardness (Hv0.2) | 62 | 49 | 51 | 50 | 51 |
| | Machinability | A | C | C | C | C |
| Perfect sintered body | Firing period (minute) | 25 | 25 | 25 | 410 | 25 |
| | Holding period (minute) | 2 | 2 | 2 | 120 | 2 |
| | Sintering temperature (° C.) | 1600 | 1600 | 1600 | 1450 | 1600 |
| | Bending strength (MPa) | 1219 | 1240 | 645 | 994 | 1224 |
| | Contrast ratio | 0.69 | 0.73 | 0.73 | 0.7 | 0.73 |

TABLE 11

| | | Reference Example 1 | Example 31 | Reference Example 2 | Example 32 | Comparative Example 11 | Comparative Example 12 |
|---|---|---|---|---|---|---|---|
| Zirconia mill blank for dental cutting and machining | Zirconia mill blank | D39 | D40 | D41 | D42 | D43 | D44 |
| | Yttrium amount (a1) in zirconia particle containing solid-solved yttrium (mol %) | 2.5 | 2.5 | 7.0 | 7.0 | 4.0 | 4.0 |
| | CIP treatment times | 10 | 10 | 10 | 10 | 1 | 1 |
| | CIP treatment times after degreasing | 0 | 0 | 0 | 0 | 0 | 0 |
| | Maximum load pressure in CIP treatment (Mpa) | 200 | 200 | 200 | 200 | 40 | 200 |
| | Pressure after releasing in CIP treatment (Mpa) | 0 | 0 | 0 | 0 | 0 | 0 |
| | Holding period of maximum load pressure in CIP treatment (minute) | 1 | 1 | 1 | 1 | 1 | 1 |
| | Specific surface area ($m^2/g$) | 6.7 | 6.7 | 6.6 | 6.6 | 7.7 | 0.9 |
| | Skeleton volume ($cm^3/g$) | 0.165 | 0.165 | 0.164 | 0.164 | 0.155 | 0.16 |
| | Pore volume ($cm^3/g$) | 0.0532 | 0.0532 | 0.0583 | 0.0583 | 0.0911 | 0.0243 |
| | Pore diameter (nm) | 166 | 75 | 134 | 148 | 207 | 46 |
| | Porosity (%) | 24.4 | 24.4 | 26.2 | 26.2 | 37.0 | 13.2 |
| | Bending strength (MPa) | 36 | 36 | 34 | 34 | 20 | 108 |
| | Vickers hardness (Hv0.2) | 61 | 61 | 60 | 60 | 41 | 233 |
| | Machinability | A | A | A | A | C | C |
| Perfect sintered body | Firing period (minute) | 25 | 410 | 25 | 410 | 25 | 25 |
| | Holding period (minute) | 2 | 120 | 2 | 120 | 2 | 2 |
| | Sintering temperature (° C.) | 1600 | 1450 | 1600 | 1450 | 1600 | 1600 |
| | Bending strength (MPa) | 1351 | 1373 | 542 | 605 | 942 | 1206 |
| | Contrast ratio | 0.8 | 0.78 | 0.69 | 0.65 | 0.75 | 0.71 |

Examples 20 to 30

It was confirmed that the porosity in each Zirconia mill blank for dental cutting and machining D24 to D34 of the Examples 20 to 30 was within a range of 15 to 30%. Furthermore, it was confirmed that the zirconia perfect sintered body prepared by sintering for a short period from each zirconia mill blank for dental cutting and machining of Examples 20 to 30 had superior bending strength more than 600 MPa. In addition, it was confirmed that it had very high translucency of a contrast ratio less than 0.70 regarding the translucency.

Comparative Example 7

In the Comparative Example 7, the Zirconia mill blank for dental cutting and machining D35 which contained 4.0 mol % of solid-solved yttrium and was prepared without repeating CIP treatment was sintered by sintering for a short period. The translucency (contrast ratio) after perfect sintering by sintering for a short period is less than 0.80 and therefore it could be used in clinical practice without problem. However, because pore volume was large and the porosity exceeded 30%, chipping resistance in cutting and machining were bad.

Comparative Example 8

In the Comparative Example 8, the Zirconia mill blank for dental cutting and machining D36 which contained 5.5 mol % of solid-solved yttrium and was prepared without repeating CIP treatment was sintered by sintering for a short period. The translucency (contrast ratio) after perfect sintering by sintering for a short period is less than 0.80 and therefore it could be used in clinical practice without problem. However, because pore volume was large and the porosity exceeded 30%, chipping resistance in cutting and machining were bad and strength after perfect sintering by sintering for a short period was not sufficient.

Comparative Example 9

In the Comparative Example 9, the Zirconia mill blank for dental cutting and machining D37 which contained 5.5 mol % of solid-solved yttrium and was prepared without repeating CIP treatment was sintered by normal sintering. The translucency (contrast ratio) after perfect sintering by sintering for a short period was less than 0.80 and therefore it could be used in clinical practice without problem. However, because pore volume was large and the porosity exceeded 30%, chipping resistance in cutting and machining were bad.

Comparative Example 10

In the Comparative Example 10, the Zirconia mill blank for dental cutting and machining D38 which contained 4.0 mol % of solid-solved yttrium and was prepared by 10 minutes of holding period of the maximum load pressure in CIP treatment without repeating CIP treatment was by sintering for a short period. The translucency (contrast ratio) after perfect sintering by sintering for a short period was less than 0.80 and therefore it could be used in clinical practice without problem. However, because pore volume was large and the porosity exceeded 30%, chipping resistance in cutting and machining were bad.

Reference Example 1

In the Reference Example 1, the Zirconia mill blank for dental cutting and machining D 39 which contained 2.5 mol % of solid-solved yttrium and was prepared by repeating CIP treatment 10 times was sintered by sintering for a short period. It was confirmed that because the amount of solid-solved yttrium was little, the translucency was insufficient and translucency was inferior to the Examples in visual observation.

Example 31

In the Example 31, the Zirconia mill blank for dental cutting and machining D40 which contained 2.5 mol % of solid-solved yttrium and was prepared by repeating CIP treatment 10 times was sintered by normal sintering. It was confirmed that it had superior bending strength more than 600 MPa like the Examples 20 to 30. Further, it was confirmed that contrast ratio was less than 0.80 and therefore it could be used in clinical practice without problem, regarding the translucency.

Reference Example 2

In the Reference Example 2, the zirconia mill blank for dental cutting and machining which contained 7.0 mol % of solid-solved yttrium and was prepared by repeating CIP treatment 10 times was sintered by sintering for a short period. It was confirmed that because the amount of solid-solved yttrium was large, although sufficient translucency was obtained, strength was inferior to the Examples 20 to 30 which were sintered by sintering for a short period.

Example 32

In the Example 32, the zirconia mill blank for dental cutting and machining which contained 7.0 mol % of solid-solved yttrium and was prepared by repeating CIP treatment 10 times was sintered by normal sintering. It was confirmed that it had superior bending strength more than 600 MPa like the Examples 20 to 30. Further, it was confirmed that it had very high translucency of a contrast ratio less than 0.70 regarding the translucency.

Comparative Example 11

In the Comparative Example 11, the zirconia mill blank for dental cutting and machining which contained 4.0 mol % of solid-solved yttrium and was prepared by 40 MPa of the maximum load pressure in CIP treatment and repeating CIP treatment 10 times was sintered by sintering for a short period. The translucency (contrast ratio) after perfect sintering by sintering for a short period was less than 0.80 and therefore it could be used in clinical practice without problem. However, because pore volume was large and the porosity exceeded 30%, chipping resistance in cutting and machining were bad.

Comparative Example 12

In the Comparative Example 12, the zirconia mill blank for dental cutting and machining which contained 4.0 mol % of solid-solved yttrium and was prepared by 1300° C. of calcination temperature was sintered by sintering for a short period. The translucency (contrast ratio) after perfect sintering by sintering for a short period was less than 0.80 and therefore it could be used in clinical practice without problem. However, because pore volume was little and the porosity was less than 15%, chipping resistance in cutting and machining were bad.

With respect to the use of substantially any plural and/or singular terms herein, those having skill in the art can translate from the plural to the singular and/or from the singular to the plural as is appropriate to the context.

Although the description herein has been given with reference to the drawings and embodiments, it should be noted that those skilled in the art may make various changes and modifications on the basis of this disclosure without difficulty. Accordingly, any such changes and modifications are intended to be included in the scope of the embodiments.

What is claimed is:

1. A preparing method of a zirconia mill blank for dental cutting and machining, comprising;

a zirconia powder molding process, and a cold isostatic pressing molding process, wherein;

the cold isostatic pressing molding process includes at least two or more of a series of processes including an application process applying a load pressure, an increase process increasing the load pressure to a maximum load pressure and a release process releasing the load pressure.

2. The preparing method of a zirconia mill blank for dental cutting and machining according to claim 1, wherein;

the zirconia powder is formed by a press molding.

3. The preparing method of a zirconia mill blank for dental cutting and machining according to claim 1, wherein; the cold isostatic pressing molding process includes a holding process holding a maximum load pressure.

4. The preparing method of a zirconia mill blank for dental cutting and machining according to claim 1, wherein; a difference between a maximum load pressure and a load pressure after releasing is at least 50 MPa or more.

5. The preparing method of a zirconia mill blank for dental cutting and machining according to claim 1, further comprising after the cold isostatic pressing molding process; a disperse process dispersing an yttrium compound on a zirconia particle containing solid-solved yttrium.

6. The preparing method of a zirconia mill blank for dental cutting and machining according to claim 1, wherein; the preparing method includes at least ten or more of the series of processes including the application process applying a load pressure, the increase process increasing the load pressure to a maximum load pressure and the release process releasing the load pressure.

7. The preparing method of a zirconia mill blank for dental cutting and machining according to claim 2, wherein; the cold isostatic pressing molding process includes a holding process holding a maximum load pressure.

8. The preparing method of a zirconia mill blank for dental cutting and machining according to claim 2, wherein; a difference between a maximum load pressure and a load pressure after releasing is at least 50 MPa or more.

9. The preparing method of a zirconia mill blank for dental cutting and machining according to claim 3, wherein; a difference between a maximum load pressure and a load pressure after releasing is at least 50 MPa or more.

10. The preparing method of a zirconia mill blank for dental cutting and machining according to claim 2, further comprising after the cold isostatic pressing molding process; a disperse process dispersing an yttrium compound on a zirconia particle containing solid-solved yttrium.

11. The preparing method of a zirconia mill blank for dental cutting and machining according to claim 3, further comprising after the cold isostatic pressing molding process; a disperse process dispersing an yttrium compound on a zirconia particle containing solid-solved yttrium.

12. The preparing method of a zirconia mill blank for dental cutting and machining according to claim 4, further comprising after the cold isostatic pressing molding process; a disperse process dispersing an yttrium compound on a zirconia particle containing solid-solved yttrium.

13. The preparing method of a zirconia mill blank for dental cutting and machining according to claim 2, wherein; the preparing method includes at least ten or more of the series of processes including the application process applying a load pressure, the increase process increasing the load pressure to a maximum load pressure and the release process releasing the load pressure.

14. The preparing method of a zirconia mill blank for dental cutting and machining according to claim 3, wherein; the preparing method includes at least ten or more of the series of processes including the application process applying a load pressure, the increase process increasing the load pressure to a maximum load pressure and the release process releasing the load pressure.

15. The preparing method of a zirconia mill blank for dental cutting and machining according to claim 4, wherein; the preparing method includes at least ten or more of the series of processes including the application process applying a load pressure, the increase process increasing the load pressure to a maximum load pressure and the release process releasing the load pressure.

16. The preparing method of a zirconia mill blank for dental cutting and machining according to claim 5, wherein; the preparing method includes at least ten or more of the series of processes including the application process applying a load pressure, the increase process increasing the load pressure to a maximum load pressure and the release process releasing the load pressure.

* * * * *